(12) United States Patent
Saenz et al.

(10) Patent No.: US 12,311,960 B2
(45) Date of Patent: May 27, 2025

(54) SAFETY SUPERVISOR SYSTEM FOR VEHICLES

(71) Applicant: LHP, Inc., Columbus, IN (US)

(72) Inventors: Adam Joseph Saenz, Chino, CA (US); Victor Hugo Aguilar, Downey, CA (US); Frank Ji Chang, Redondo Beach, CA (US); Steven Joseph Neemeh, Yorba Linda, CA (US)

(73) Assignee: LHP, Inc., Columbus, IN (US)

( * ) Notice: Subject to any disclaimer, the term of this patent is extended or adjusted under 35 U.S.C. 154(b) by 215 days.

(21) Appl. No.: 17/659,364

(22) Filed: Apr. 15, 2022

(65) Prior Publication Data

US 2022/0242424 A1 Aug. 4, 2022

Related U.S. Application Data

(63) Continuation of application No. PCT/US2020/055981, filed on Oct. 16, 2020.
(Continued)

(51) Int. Cl.
*B60W 50/02* (2012.01)
*B60W 50/12* (2012.01)
*G07C 5/08* (2006.01)

(52) U.S. Cl.
CPC ............ *B60W 50/02* (2013.01); *B60W 50/12* (2013.01); *G07C 5/0816* (2013.01); *B60W 2710/0677* (2013.01); *B60W 2710/18* (2013.01)

(58) Field of Classification Search
CPC .. B60W 20/50; B60W 50/02; B60W 50/0205; B60W 50/0225; B60W 50/023;
(Continued)

(56) References Cited

U.S. PATENT DOCUMENTS 9,195,232 B1 11/2015 Egnor et al.
11,308,739 B2 4/2022 Cui et al.
(Continued)

FOREIGN PATENT DOCUMENTS

CN 109367501 A 2/2019
KR 20110071596 A 11/2010

OTHER PUBLICATIONS van der Perk, A distributed safety mechanism for autonomous vehicle software using hypervisors, Jun. 2019, Eindhoven University of Technology (Year: 2019).*
(Continued)

*Primary Examiner* — Russell Frejd
*Assistant Examiner* — Sara J Lewandroski
(74) *Attorney, Agent, or Firm* — Woodard, Emhardt, Henry, Reeves & Wagner, LLP

(57) ABSTRACT

A safety controller is configured to monitor at least one vehicle controller that is separate from the safety controller. The safety controller is operatively connected to monitor inputs and outputs of the vehicle controller. The safety controller includes a standard computing module with customized input and output modules. The safety controller is configured to override vehicle controller commands to items controlled by the vehicle controller. In one form, the vehicle controller handles level 1 functions and safety controller handles level 2 and 3 monitoring. In one particular example, the safety controller is at a minimum ISO 26262 ASIL C certified. The safety controller in one aspect uses an AUTomotive Open System ARchitecture (AUTOSAR).

18 Claims, 20 Drawing Sheets

Related U.S. Application Data

(60) Provisional application No. 62/915,901, filed on Oct. 16, 2019.

(58) Field of Classification Search
CPC ............. B60W 50/209; B60W 50/035; B60W 50/038; B60W 50/04; B60W 50/045; B60W 50/12; B60W 2050/021; B60W 2050/0215; B60W 2050/022; B60W 2050/0292; B60W 2050/0295; B60W 2050/0297; B60W 2050/041; B60W 2050/043; B60W 60/001; B60W 60/0015; B60W 60/0016; B60W 60/0018; B60W 60/00186; B60W 60/007

See application file for complete search history.

(56) References Cited

U.S. PATENT DOCUMENTS

| | | | | |
|---|---|---|---|---|
| 11,656,583 | B2* | 5/2023 | Hwang | ................ G05B 13/027 700/40 |
| 2006/0089763 | A1 | 4/2006 | Barrett et al. | |
| 2006/0162986 | A1 | 7/2006 | Disser et al. | |
| 2008/0082234 | A1* | 4/2008 | Majersik | ............ B60G 17/0162 701/37 |
| 2010/0292867 | A1 | 11/2010 | Bohm et al. | |
| 2013/0173767 | A1 | 7/2013 | Nakamura et al. | |
| 2015/0033357 | A1 | 1/2015 | Habel et al. | |
| 2015/0057908 | A1 | 2/2015 | Carbonaro et al. | |
| 2016/0217023 | A1* | 7/2016 | Wada | ................... G06F 11/0739 |
| 2016/0264150 | A1* | 9/2016 | Freiwald | .................. G05B 9/03 |
| 2018/0267535 | A1 | 9/2018 | Robert et al. | |
| 2018/0268624 | A1 | 9/2018 | Remboski et al. | |
| 2018/0307635 | A1 | 10/2018 | Rota | |
| 2019/0034256 | A1* | 1/2019 | Fox | ..................... G06F 12/0646 |
| 2019/0049914 | A1 | 2/2019 | Munafo et al. | |
| 2019/0121359 | A1* | 4/2019 | Dobberphul | ........ B60W 50/029 |
| 2019/0283768 | A1 | 9/2019 | Das | |
| 2020/0207374 | A1* | 7/2020 | Li | ....................... G06F 11/3013 |
| 2020/0331500 | A1* | 10/2020 | Shabtai | ................ G05D 1/0055 |
| 2021/0086783 | A1* | 3/2021 | Petre | ..................... B60W 50/035 |

OTHER PUBLICATIONS

EP, App. No. 20878001.5 Extended European Search Report, 7 pages, Oct. 16, 2023.

PCT, Intl. App. No. PCT/US2020/055981 International Search Report, 4 pages, Feb. 10, 2021.

PCT, Intl. App. No. PCT/US2020/055981 Written Opinion of the International Searching Authority, 7 pages, Feb. 10, 2021.

* cited by examiner

SAFETY SUPERVISOR SYSTEM FOR VEHICLES

CROSS REFERENCE TO RELATED APPLICATIONS

This application is a continuation of International Patent Application Number PCT/US2020/055981, filed Oct. 16, 2020, which is hereby incorporated by reference. International Patent Application Number PCT/US2020/055981, filed Oct. 16, 2020, claims the benefit of U.S. Patent Application No. 62/915,901, filed Oct. 16, 2019, which are hereby incorporated by reference.

BACKGROUND

The ISO 26262 series of standards is concerned with functional safety of electrical and electronic (E/E) systems for road vehicles. With increasing technological complexity, software content and mechatronic implementation, there are increasing risks from systematic failures and random hardware failures in E/E systems. Functional safety is the absence of unreasonable risk due to hazards caused by malfunctioning behavior of E/E systems.

ISO 26262 series of standards provides guidance to achieve functional safety in road vehicles by providing a reference for the automotive safety lifecycle, providing a risk-based approach to determine Automotive Safety Integrity Levels (ASILs), using ASILs to specify which requirements of the ISO 26262 standard are applicable, and providing requirements for functional safety management, design, implementation, verification, validation and conformation measures.

In order to create functionally safe products, an organization must establish functional safety within the organization. ISO 26262 identifies the need for training, management, establishment of a trusted process, the ability to manage requirements, configuration, and changes. ISO 26262 also identifies over 100 work products that may be required as a part of establishing a safety case for a product. In order to meet the requirements of ISO 26262, an organization will spend a significant amount of time and money in the establishment and execution of an ISO 26262 compliant workflow.

Thus, there is a need for improvement in this field.

SUMMARY

A unique safety control system has been developed in which a safety controller or "safety supervisor" is configured to monitor at least one vehicle controller. The safety controller is separate from the vehicle controller so that all components and software in the vehicle controller, especially those with no safety risk, do not have to be designed according to the most stringent safety standards.

To provide some background, the Automotive Safety Integrity Level (ASIL) is a risk classification system that is defined by the International Standards Organization (ISO) 26262 functional safety for road vehicle standard. The classification system helps define the safety requirements necessary to be in line with the ISO 26262 standard. The ASIL establishes this standard by performing risk analysis of potential hazards by looking at the severity, exposure, and controllability of vehicle operations in various scenarios. There are four ASIL standards defined by the letters A, B, C, and D. The ASIL D dictates the highest integrity requirements for a product under the ASIL standard, and ASIL A requires the lowest safety requirements. Quality management or QM level means that the risk associated with hazards is not unreasonable and does not therefore require safety measures in accordance with the ISO 26262 standard.

The traditional approach was to incorporate components and software with different ASIL classification levels in the same controller. When designing vehicle controllers, the vehicle controllers would have to be then designed and manufactured according to the highest level standard of any function performed by the controller. Thus for example, a controller with one function under the highest ASIL D level will require all other components in the controller to be designed according to the most stringent ASIL D standard, even those with a QM rating.

From concept level, outside of the ISO 26262 standard, the functionality of the controllers can be generally categorized into three main levels. Generally speaking, the level I systems concern the main control functions and algorithms used for the vehicle controller. Level II, or the functional monitoring level, systems monitor the proper operation of the level I systems by performing rationality checks, and if needed, initiating any safe states on the controlled component (e.g., an engine) to reduce any harm. The controller monitoring level, or level III, systems verify the proper operation of the hardware/software interaction of the level I and II systems as well as initiate safe state activation. In traditional controller designs, all three levels (i.e., levels I, II, and III) were performed inside the same controller. In the proposed safety supervisor system, the level I functions are performed by the vehicle controller, and the level II and III monitoring functions are performed by the separate safety controller.

Since it handles level II and III functions, the separate safety controller is designed and in accordance with the highest ASIL rating required by the application. In contrast, the vehicle controller can be then designed and made in accordance with lower ASIL standards or even at the QM level. As result, this separate safety controller design can save labor and design costs. The vehicle controller can be readily designed and upgraded with considerably less engineering time devoted to conforming with the highest ASIL standards that may not apply to the particular changes made or the vehicle controller in general.

With it being separate, the safety controller is designed to receive input signals from sensors and various other inputs to the vehicle controller as well as monitor any outputs from the vehicle controller. Through this information, the safety controller determines whether the outputs from the vehicle controller are rational in light of the inputs to the vehicle controller. If not, the safety controller is able to send safe state activation signal or other output signals to override the output signals from the vehicle controller.

For example, in a diesel engine controller environment, the separate safety controller monitors the signals from the accelerator pedal, intake manifold pressure, and exhaust manifold pressure that are sent to a diesel engine controller. The safety controller then monitors the output of the diesel engine controller to make sure that the output commands from the vehicle controller are rational in view of the current circumstances (e.g., based on sensory input information). If needed, the safety controller is able to override commands from the vehicle controller and instruct the fuel injector driver that controls the fuel injector of the engine to perform any type of safety interaction. Once more with, the diesel engine controller is designed to perform the level I functions as well as the safety controller handles the level II and level III controllers. With this construction, only the safety controller needs to be ISO 26262 certified whereas the diesel engine controller does not need to be. This in turn helps save design costs and allows companies to focus on more pertinent matters.

In one particular example, the safety controller includes a standard computing module along with customized input and output modules. The input and output modules are customized for the particular customer use case where the computing model is a simple standardized unit that is able to be used across multiple customer platforms. The safety controller uses the AUTOSAR (AUTomotive Open System ARchitecture). Using AUTOSAR, the run time environment (RTE) and basic software (BSW) are developed under the strictest standard or ASIL D certification standard. With AUTOSAR system architecture, all ASIL rated (i.e., A, B, C, and D) software components are installed on the safety controller. This design allows greater interoperability between various functions within the vehicle. Software can be easily ported back and forth between the vehicle controller and safety controller.

The system and techniques as described and illustrated herein concern a number of unique and inventive aspects. Some, but by no means all, of these unique aspects are summarized below.

Aspect 1 generally concerns a system that includes a safety controller configured to monitor at least one vehicle controller that is separate from the safety controller.

Aspect 2 generally concerns the system of any previous aspect in which the safety controller is operatively connected to monitor inputs and outputs of the vehicle controller.

Aspect 3 generally concerns the system of any previous aspect in which the safety controller is configured to override vehicle controller commands to items controlled by the vehicle controller.

Aspect 4 generally concerns the system of any previous aspect in which the vehicle controller handles level 1 functions and safety controller handles levels 2 and 3 monitoring.

Aspect 5 generally concerns the system of any previous aspect in which the safety controller is ISO 26262 ASIL C or D certified.

Aspect 6 generally concerns the system of any previous aspect in which the safety controller includes a standard computing module with customized input and output modules.

Aspect 7 generally concerns the system of any previous aspect in which the safety controller uses an AUTomotive Open System ARchitecture (AUTOSAR).

Aspect 8 generally concerns the system of any previous aspect in which the runtime environment (RTE) and basic software (BSW) is developed under ASIL D standards.

Aspect 9 generally concerns the system of any previous aspect in which the all ASIL rated software components are located on the safety controller.

Aspect 10 generally concerns the system of any previous aspect in which the vehicle controller includes an electronic control unit (ECU).

Aspect 11 generally concerns the system of any previous aspect in which the ECU includes a powertrain control module (PCM).

Aspect 12 generally concerns the system of any previous aspect in which the ECU includes a brake control module (BCM).

Aspect 13 generally concerns the system of any previous aspect in which the ECU includes a transmission control module (TCM).

Aspect 14 generally concerns the system of any previous aspect in which the ECU includes an engine control module (ECM).

Aspect 15 generally concerns the system of any previous aspect in which the controller area network (CAN) operatively connecting the safety controller to the vehicle controller.

Aspect 16 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
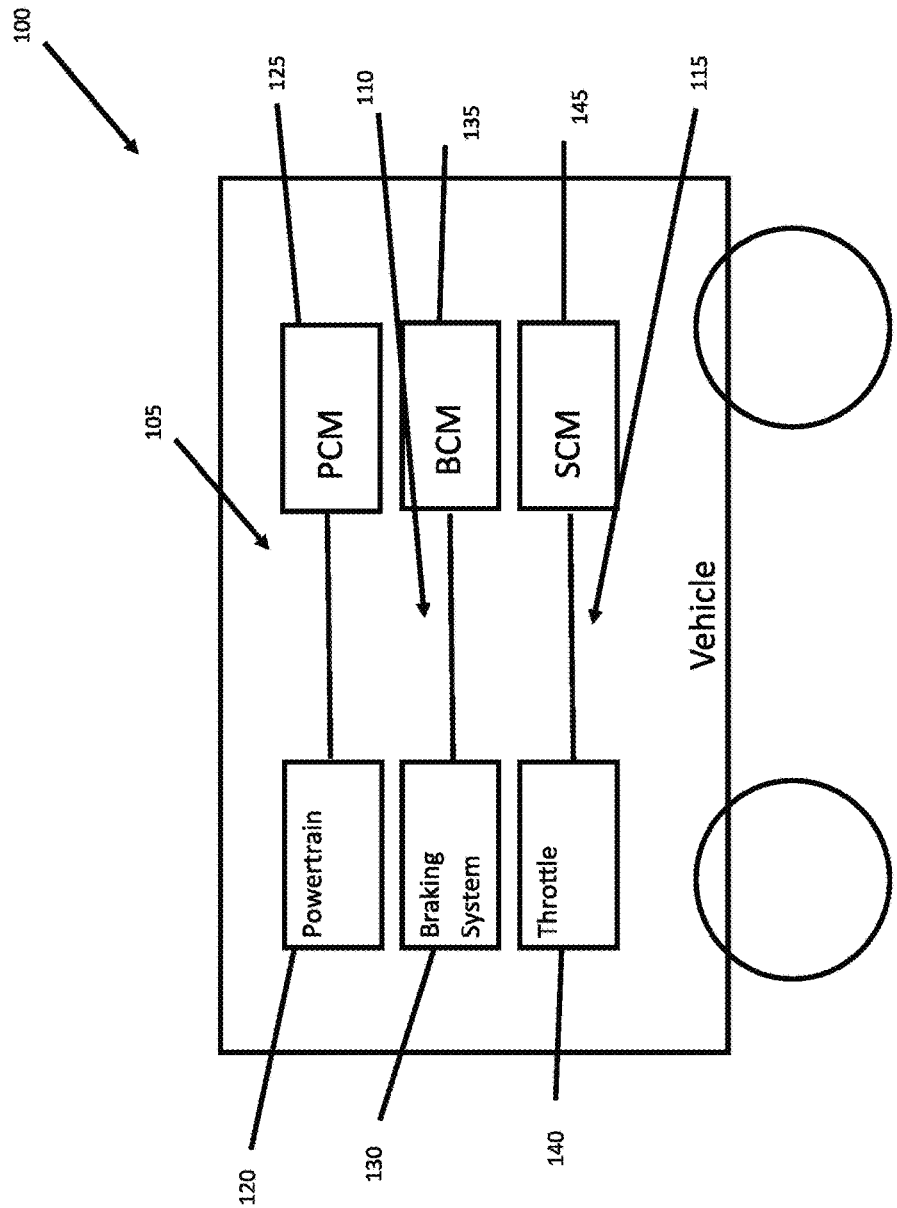
FIG. 1 is a block diagram of a vehicle.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

As illustrated in FIG. 1, a vehicle 100 according to one example includes a powertrain system 105, a braking system 110, and a speed control system 115. In one example, the vehicle 100 includes an automobile, but it should be recognized that the system described herein can be used on other types of vehicles. The powertrain system 105 includes a powertrain 120 and a powertrain control module 125. The powertrain 120 may include an engine, a transmission, an electric motor, a differential, an axel, a driveshaft, an or any other vehicular component assisting in the creation of power such as for moving the vehicle 100 and/or powering power take-off (PTO) systems. The powertrain control module 125 interfaces with the powertrain 120 to control the amount of power generated. The braking system 110 includes one or more brakes 130 and a brake control module 135. The brakes 130 and the brake control module 135 work together to safely slow or stop a vehicle. As should be appreciated, the brake control module 135 assists in controlling the operation of the brakes 130. The speed control system 115 includes a throttle 140 and a speed control module 145. The speed control module 145 with the throttle 140 regulates the speed of the vehicle 100. It should be appreciated that the vehicle 100 can include other types of control systems such as those used to control steering and cabin temperature.

Figure 2:
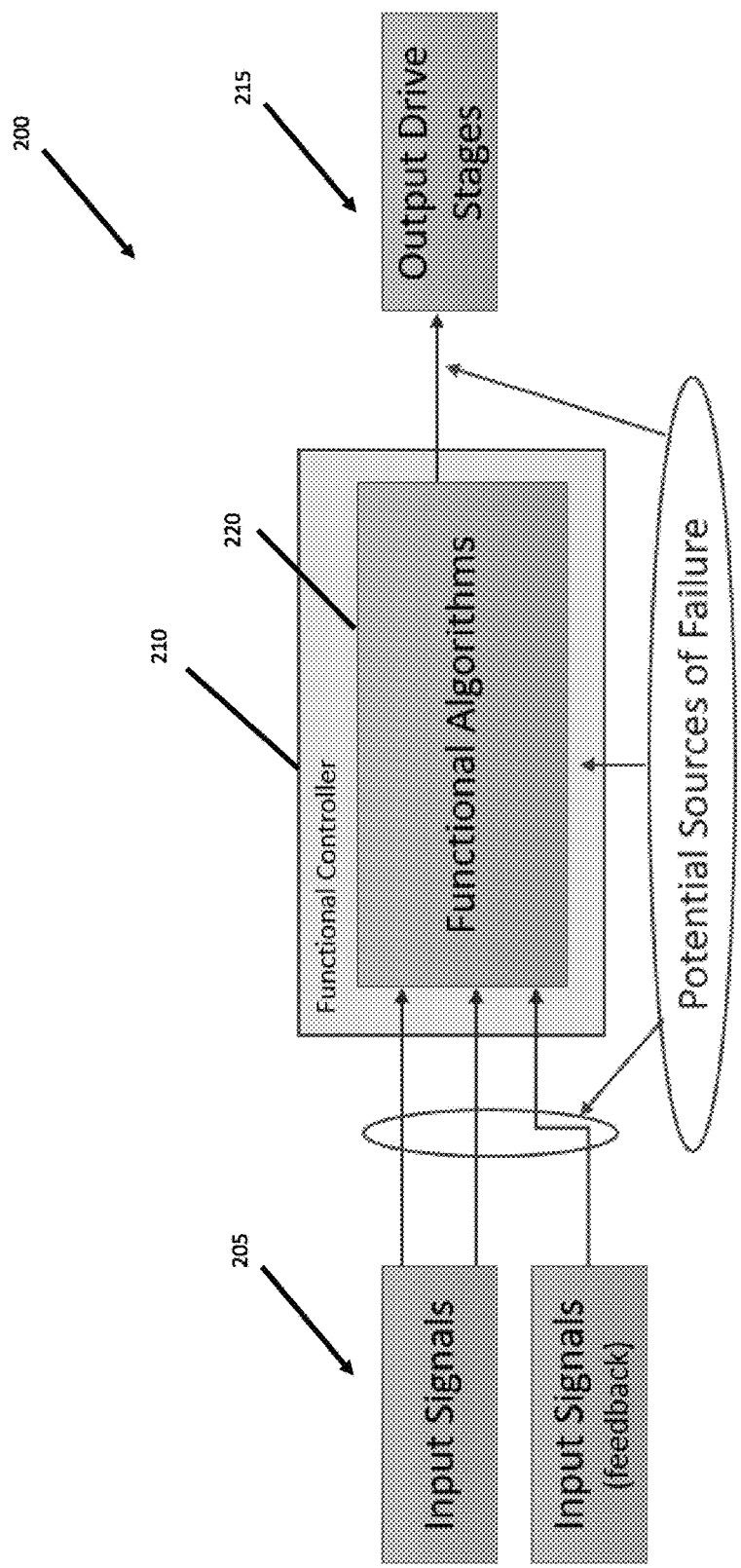
FIG. 2 is a block diagram of a control system.

FIG. 2 depicts an example of a control system 200 that can be used in the FIG. 1 vehicle 100. In the illustrated example, the control system 200 includes an input communication channel 205, a controller 210, and an output communication channel 215. The controller 210 in one example is a microcontroller that includes a processor and memory. The controller 210 in one variation is programmed with one or more functional algorithms 220 such as in the form of software and/or firmware. Typically, the design, function, and operational properties of each component of the control system 200 must satisfy the International Organization for Standardization (ISO) 26262 standard for safety. As is shown in FIG. 2, each component includes a potential source of failure within the control system 200. In order to ensure functional safety of the control system 200, failures that would violate safety standards are monitored, and the controller 210 has the ability to transition to a safe state and inform a user of the failure condition if such an event were to occur.

Figure 3:
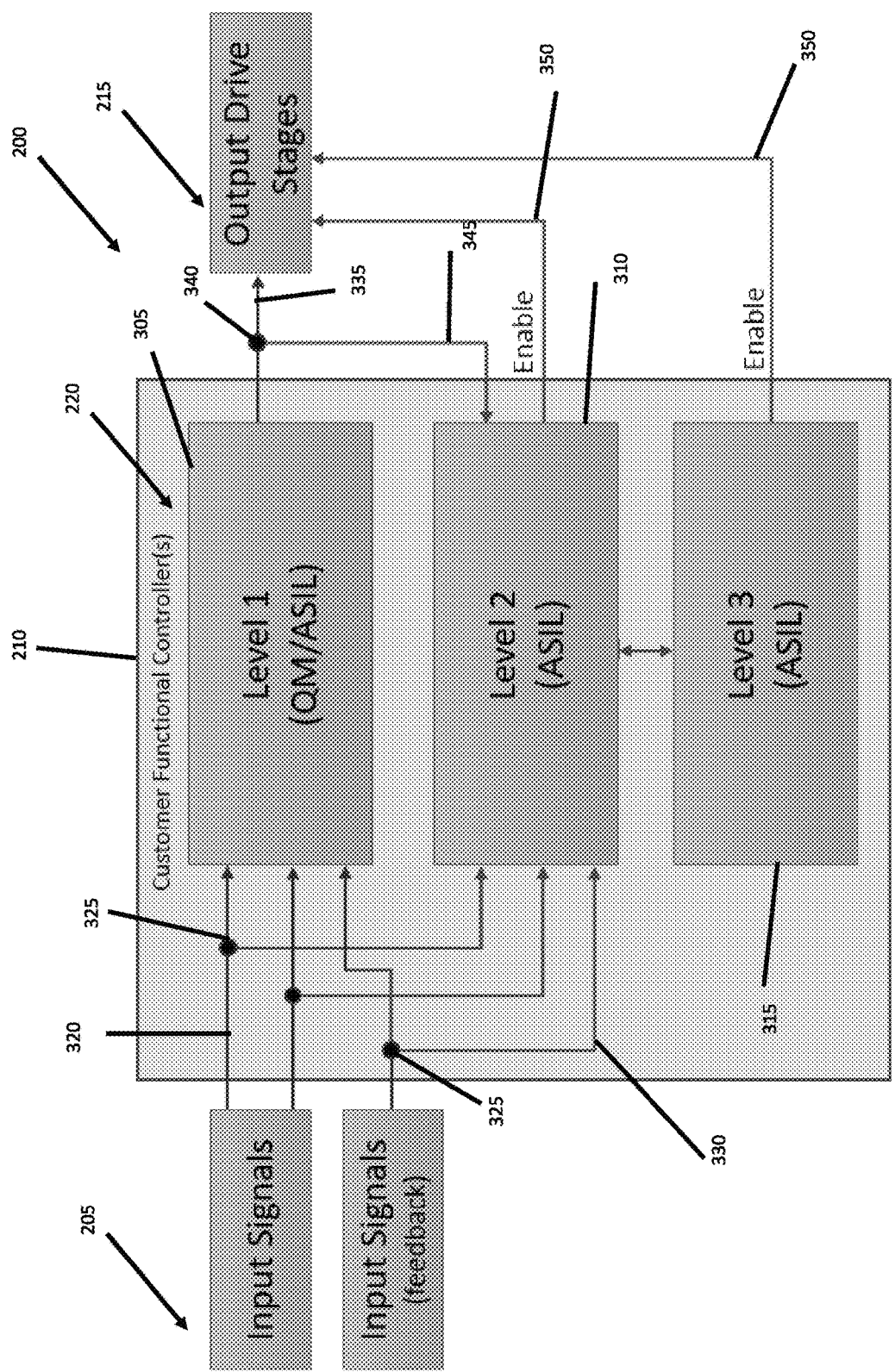
FIG. 3 is a block diagram of another example of the control system.

FIG. 3 shows further details of the particular types of functional algorithms 220 operating on the FIG. 2 controller 210. As depicted, the functional algorithms 220 include a level 1 algorithm 305, a level 2 algorithm 310, and a level 3 algorithm 315. The level 1 algorithm 305 is configured as the functional level controller that controls basic operations of the vehicle 100. For example, the level 1 algorithm 305 monitors and performs low level or basic functions of the system being controlled. The level 2 algorithm 310 monitors the proper operation of the level 1 algorithm 305 operations, sometimes called rationality checks. Based on data obtained from the input communication channels 205 and controllers 210, the level 2 algorithm 310 is able to determine whether the level 1 algorithm 305 is functioning properly. If the level 1 algorithm 305 is not properly functioning, the level 2 algorithm 310 is configured to activate a safe state to ensure the safety of the occupants of the vehicle 100 as well as others. For example, when the level 2 algorithm 310 determines that the level 1 algorithm 305 failed to issue a proper braking command in the braking system 110, the level 2 algorithm 310 will override commands from the level 1 algorithm 305 and issue a command to the brakes 130 to slow down the vehicle 100. The level 3 algorithm 315 is configured to monitor the operation of the level 2 algorithm 310 as well as other components of the control system 200. For example, the level 3 algorithm 315 is configured to verify the proper operation of the hardware and software components of the control system 200. Similar to the level 2 algorithm 310, the level 3 algorithm 315 is able to activate a safe state or take other measures when the level 3 algorithm 315 determines the level 2 algorithm 310 is not operating properly.

As can be seen, the level 1 algorithm 305 includes a command communication link 320 between the input communication channel 205 and the level 1 algorithm 305. The command communication link 320 carries input information from the input communication channel 205 to the level 1 algorithm 305. The command communication link 320 includes one or more nodes 325. The nodes 325 branch into a safety communication link 330 which lead to the level 2 algorithm 310. The safety communication link 330 carries the same input information to the level 2 algorithm 310 to allow for comparison and rationality checks. The level 1 algorithm 305 further includes an output communication link 335 between the output communication channel 215 and the level 1 algorithm 305. The output communication link 335 carries the output information to the output communication channel 215 for execution. The output communication link 335 includes a node 340. The node 340 branches into a verification communication link 345 which leads to the level 2 algorithm 310. The verification communication link 345 allows the level 2 algorithm 310 to compare the input from the safety communication link 330 to the output from the verification communication link 345. The level 2 algorithm 310 then communicates with the level 3 algorithm 315. An enabling communication link 350 allows the output communication channel 215 to commence once verified by the level 2 algorithm 310 and/or level 3 algorithm 315.

With the control system 200 depicted in FIGS. 2 and 3, the controller 210 and the individual functional algorithms 220 must be designed to the strictest ISO 26262 safety standards, even if the particular functional algorithm 220 does not require such a high standard. For example, certain sensors and/or code might sense or control certain non-safety related functions such as monitoring wind shield wiper fluid levels or the outside temperate. If these non-safety critical components or functions are incorporated into a controller system that has safety critical components or functions, then these non-safety critical functions must be designed according to the stricter safety standards. It was recognized that such a system hampered design changes as well as increased design costs of the control systems in the vehicle 100.

Figure 4:
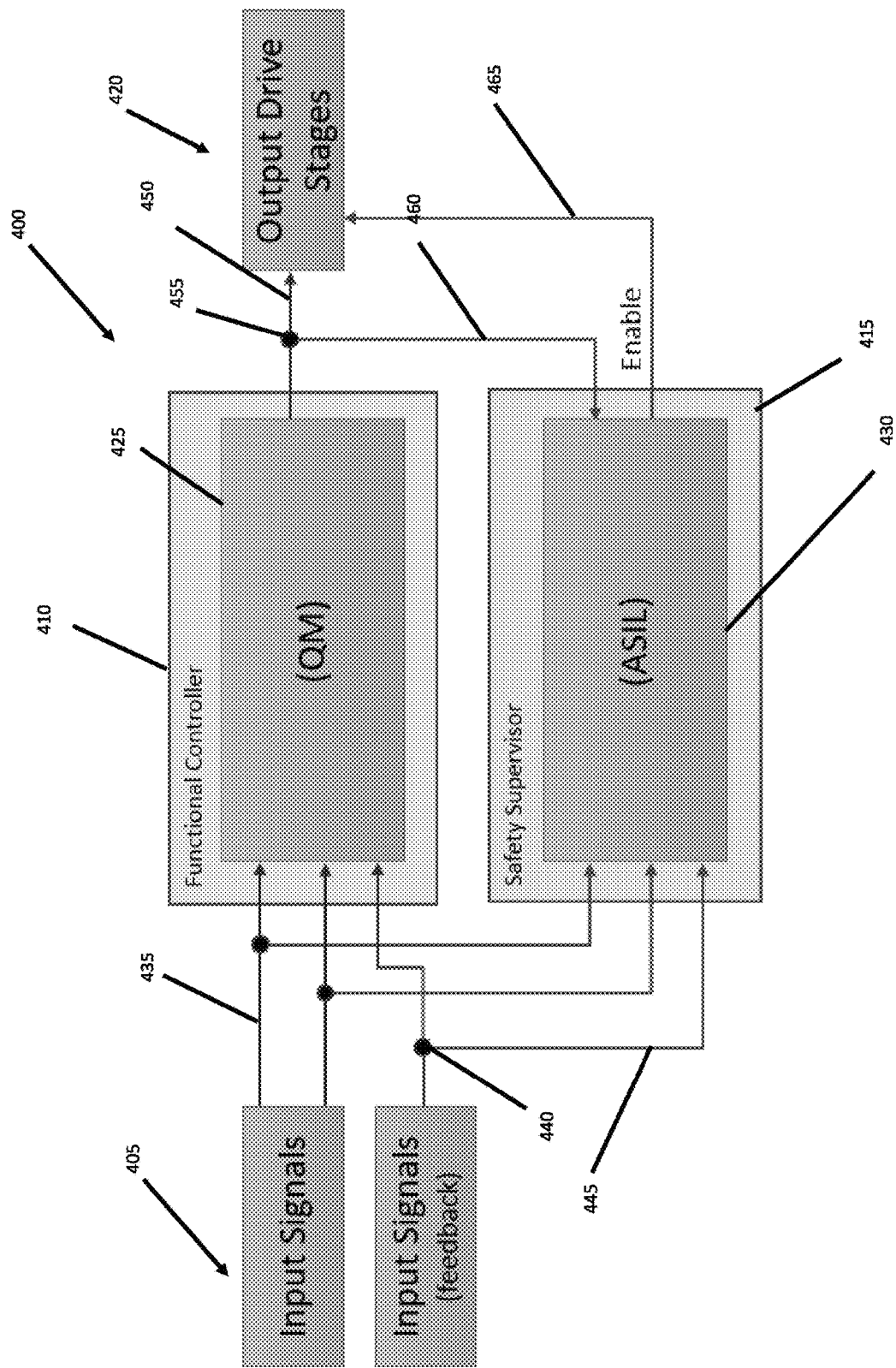
FIG. 4 is a block diagram of a safety supervisor system.

Looking at FIG. 4, a unique safety supervisor system 400 has been developed to address these as well as other issues. As shown, the safety supervisor system 400 includes an input communication channel 405, a controller 410, a safety supervisor 415, and an output communication channel 420. The safety supervisor 415 is designed as a system that is separate from the controller 410. The safety supervisor 415 in one form is a microcontroller that is physically separate from the controller 410. The safety supervisor 415 can include other types of controllers and/or computers in other examples. The safety supervisor 415 in certain examples include one or more processors and memory configured to execute software and/or firmware code. By being separate, the safety supervisor 415 allows a control system of the vehicle 100 to meet or exceed functional safety requirements by offloading functional safety activities away from the controller 410. In one example, the safety supervisor 415 is designed to the strictest safety standards. Since the safety supervisor 415 is designed to a high safety standard, the controller 410 can be designed according to a lower standard that is more appropriate to the functions of the controller 410. This configuration in turn reduces design cost as well as can enhance overall safety. The safety supervisor 415 monitors inputs, outputs, and the controller 410 for proper operation. If a fault is detected that could violate a safety protocols or cause a hazardous event, the safety supervisor 415 transitions the system to a safe state so as to override the controller 410 and take corrective actions. For instance, the safety supervisor 415 in the braking system 110 can take over braking functions of the controller 410 for the brake control module 135 when the controller 410 is determined to be malfunctioning.

Like in the earlier example, the controller 410 includes a controller algorithm 425. In one example, the controller algorithm 425 has a QM safety rating, and the safety supervisor 415 is designed according to the most stringent ASIL D standard. The safety supervisor 415 includes a safety supervisor algorithm 430 in one form is designed and implemented according to the ASIL D rating. The controller algorithm 425 includes a command communication link 435 between the input communication channel 405 and the controller algorithm 425. The command communication link 435 transfers the input communication channel 405 into the controller 410. The command communication link 435 has one or more nodes 440. The nodes 440 branch into a safety supervisor communication link 445 which connects to the safety supervisor algorithm 430. The safety supervisor communication link 445 carries the input communication channel 405 into the safety supervisor 415 for analysis. The controller algorithm 425 includes an output communication link 450 between the controller algorithm 425 and the output communication channel 420. The output communication link 450 carries output information from the controller 410 to the output communication channel 420. The output communication link 450 includes a node 455. The node 455 branches into a verification communication link 460. The verification communication link 460 allows the safety supervisor 415 to compare the actual and expected output values. If the values are verified by the safety supervisor 415, an enabling communication link 465 allows the output communication link 450 to commence once verified by the safety supervisor algorithm 430.

Figure 5:
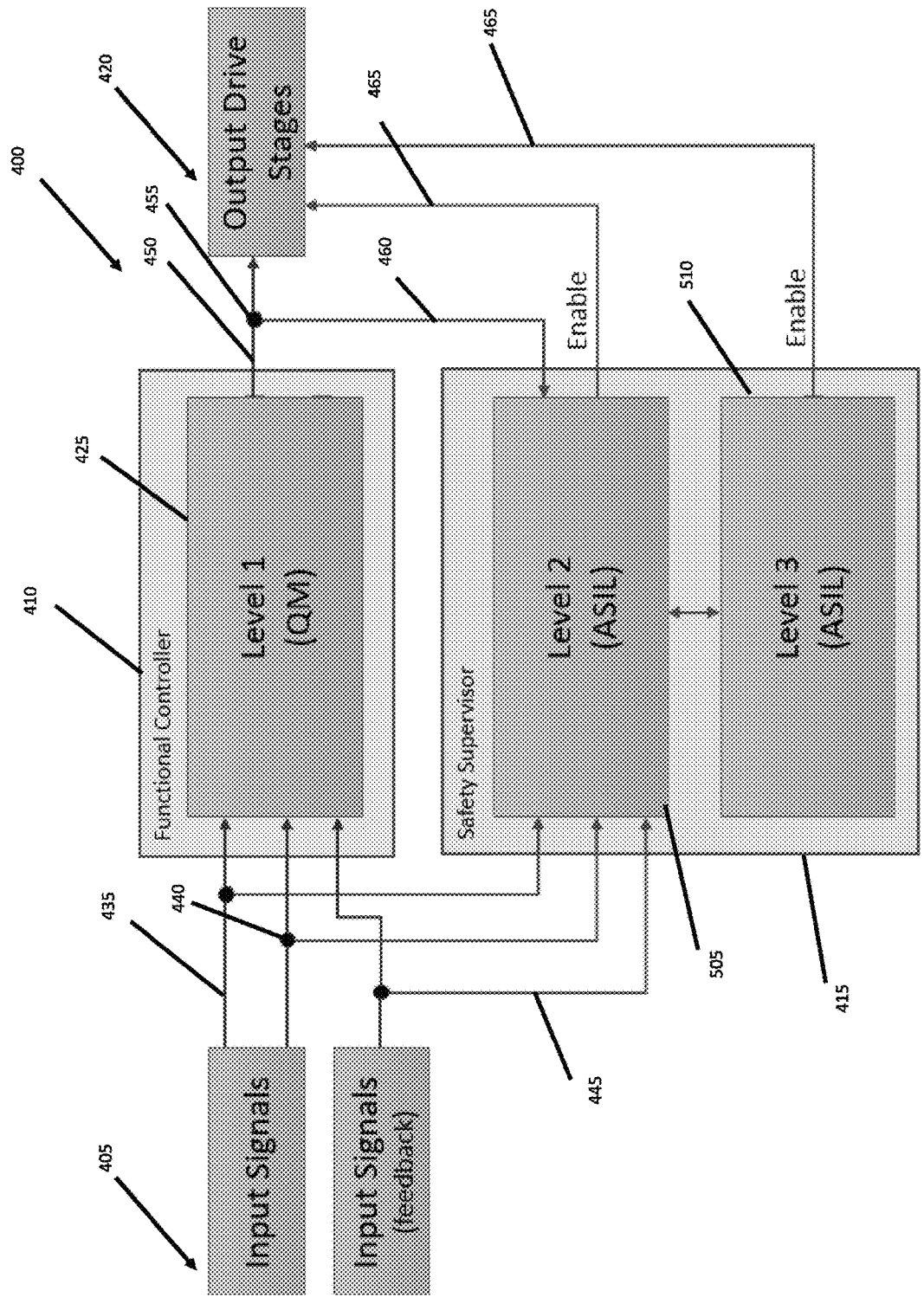
FIG. 5 is a block diagram of another example of the safety supervisor system.

FIG. 5 shows a more detailed view of the functional systems of the FIG. 4 safety supervisor system 400. As can be seen, the safety supervisor 415 further includes a level 2 algorithm 505 and a level 3 algorithm 510. In other words, the safety supervisor algorithm 430 of FIG. 4 is separated into the level 2 algorithm 505 and the level 3 algorithm 510. The level 2 algorithm 505 and level 3 algorithm 510 in certain examples are in the form of software and/or firmware code that is executed via the safety supervisor 415. The level 2 algorithm 505 is configured to monitor the operation of the controller 410, and if needed, the level 2 algorithm 505 is able to override the commands from the controller algorithm 425 on the controller 410 to ensure proper safety. Again, if needed, the level 2 algorithm 505 is configured to activate a safe state for the vehicle 100. The safe state is a condition where the level 2 algorithm 505 notices a difference between the expected output and the actual output from the controller algorithm 425. In this case, the level 2 algorithm 505 prevents or overrides the output from the controller 410, and the level 2 algorithm 505 places the vehicle 100 into a safe state. The level 3 algorithm 510 is configured to monitor the operation of the level 2 algorithm 505. The level 3 algorithm 510 may also verify the proper operation of the hardware and software components of the safety supervisor system 400. Similar to the level 2 algorithm 505, the level 3 algorithm 510 activates a safe state when the expected output and actual output from the level 2 algorithm 505 do not match. The redundancy provided by the safety supervisor 415 enhances the safety of the safety supervisor system 400. In one example, the level 2 algorithm 505 and the level 3 algorithm 510 in the safety supervisor 415 are designed and implemented according to the highest safety standard required for the particular controller system. The level 2 algorithm 505 and level 3 algorithm 510 for instance can be designed according to a standard that is higher than that required by the controller 410. In one form, the level 2 algorithm 505 and level 3 algorithm 510 on the safety supervisor 415 have the strict ASIL D rating, and the controller algorithm 425 on the controller 410 has a lower rating such as a QM safety rating.

Figure 6:
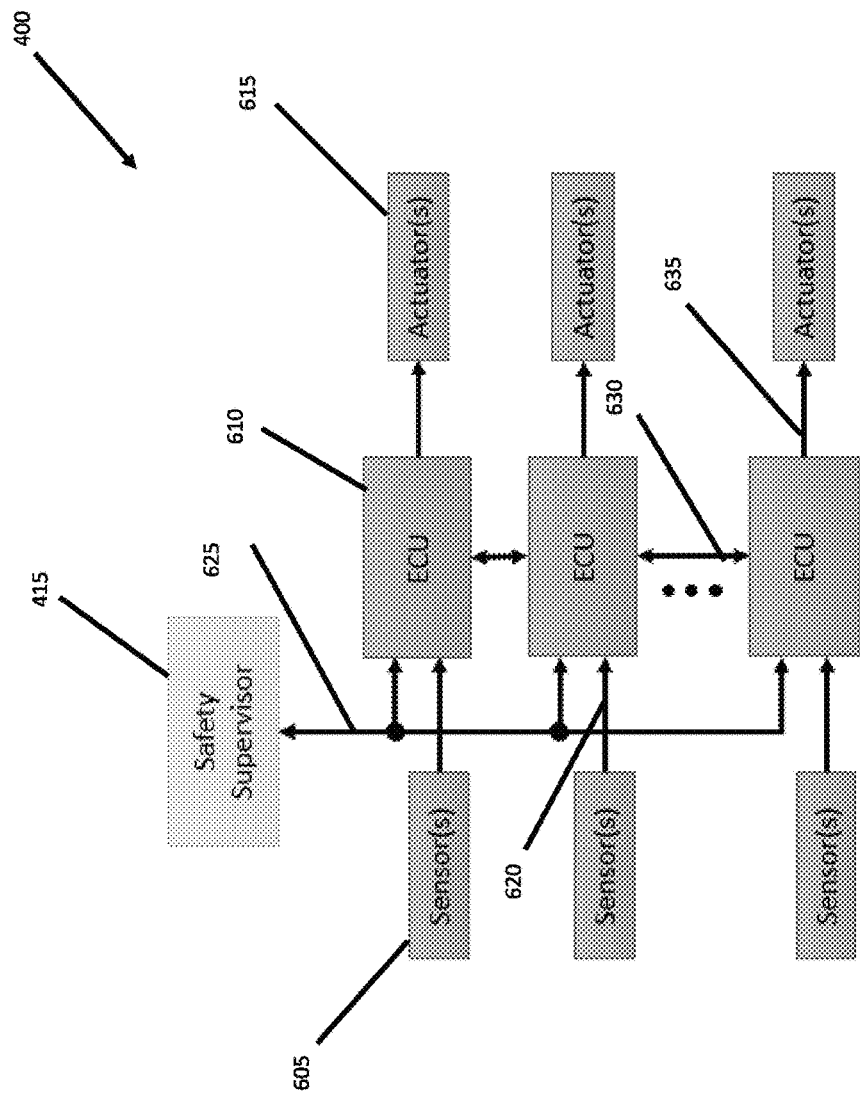
FIG. 6 is a block diagram of a further example of the safety supervisor system.

The safety supervisor 415 can be designed to monitor the operation of individual controllers or multiple controllers at the same time. When the safety supervisor 415 monitors multiple control systems, the overall cost of the vehicle 100 can be reduced, and the design time for updating individual components of the vehicle 100 can be shortened. FIG. 6 shows an example where the safety supervisor 415 monitors and controls the operation of physically separate control units for the vehicle 100. As shown, one or more sensors 605 connect to a corresponding electronic control unit (ECU) 610. The electronic control unit 610 can include a wide variety of control module types. By way of non-limiting examples, the electronic control unit 610 may be an engine control module, a powertrain control module, a transmission control module, a brake control module, a central control module, a central timing module, a general electronic module, a body control module, a suspension control module, and/or any combination thereof. The electronic control unit 610 connects to the safety supervisor 415 and one or more actuators 615. A sensor communication link 620 connects the sensors 605 and the electronic control unit 610. The sensor communication link 620 further allows communication between the sensors 605 and the electronic control unit 610. A safety supervisor communication link 625 connects the safety supervisor 415 and the electronic control unit 610. The safety supervisor communication link 625 connects to each electronic control unit 610 individually and monitors the operations of each electronic control unit 610. As has been discussed previously, if an electronic control unit 610 is found to be operating in an unsafe manner the safety supervisor 415 will over-ride the commands and place the vehicle in a safe state and/or take other corrective actions like providing an alert to the driver. An ECU communication link 630 connects the electronic control units 610. The ECU communication link 630 enables the electronic control units 610 to communicate with each other in order to verify proper operational procedures and instructions. An actuator communication link 635 connects the electronic control unit 610 and the actuators 615. The actuator communication link 635 allows the electronic control unit 610 to send instructions to the actuators 615.

Figure 7:
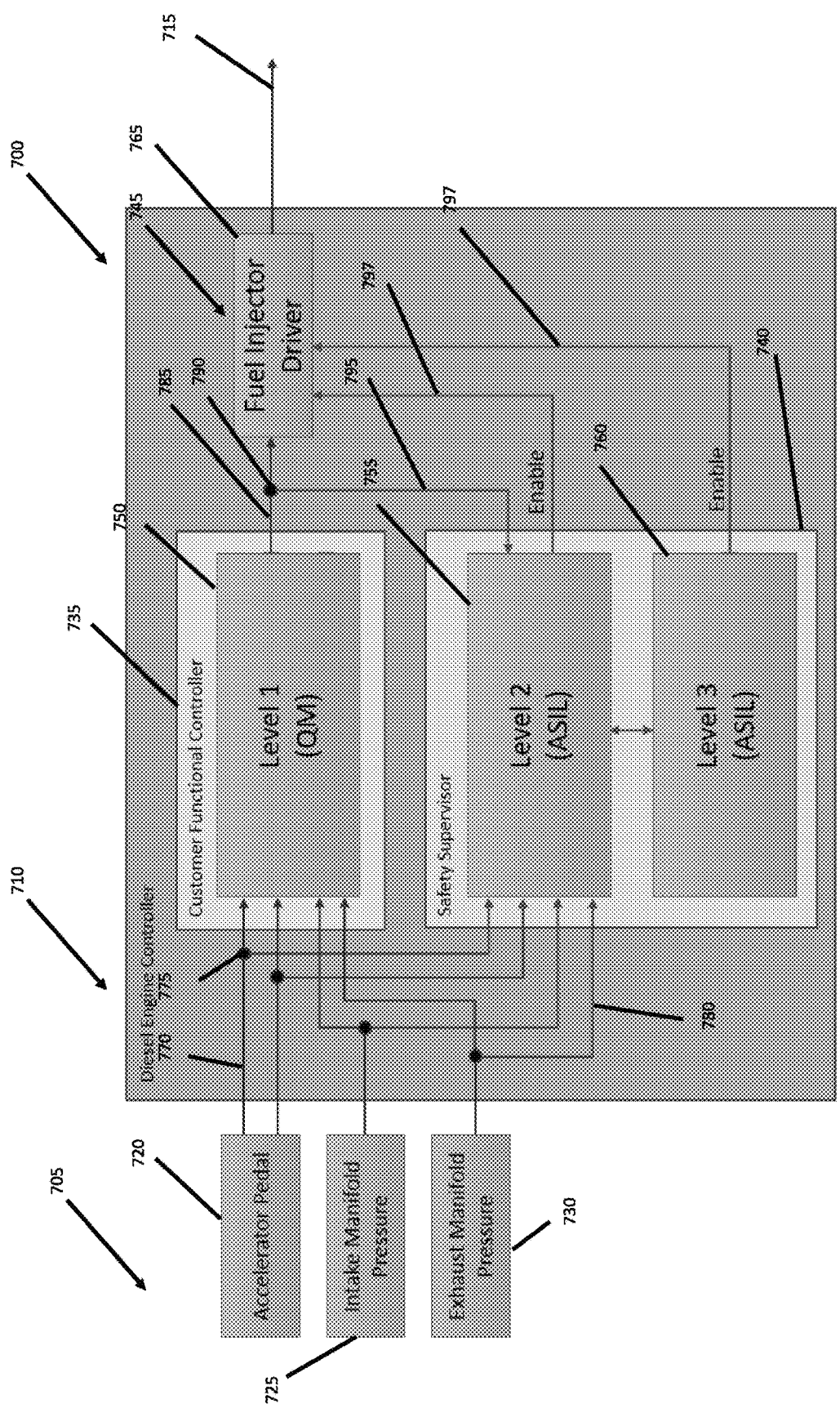
FIG. 7 is a block diagram of a diesel engine controller system.

The safety supervisor system 400 can be implemented in a wide variety of environments and use cases. For example, as illustrated in FIG. 7, a diesel engine controller system 700 includes an input communication channel 705, a diesel engine controller 710, and one or more outputs 715. The input communication channel 705 includes an accelerator pedal 720, intake manifold pressure 725, and exhaust manifold pressure 730. In other examples, the input communication channel 705 may be different. The diesel engine controller 710 includes a controller 735, a safety supervisor 740, and an output device 745. The controller 735 includes a level 1 algorithm 750. The safety supervisor 740 includes a level 2 algorithm 755 and a level 3 algorithm 760. The output device 745 includes a fuel injector driver 765. In other examples, the output device 745 may be different. A command communication link 770 connects the input communication channel 705 and the level 1 algorithm 750. The command communication link 770 transmits input information from the input communication channel 705 into the controller 735 for processing. The command communication link 770 includes one or more nodes 775. The nodes 775 branch into a safety supervisor communication link 780. The safety supervisor communication link 780 connects to the level 2 algorithm 755. The safety supervisor communication link 780 transmits the information from the input communication channel 705 to the level 2 algorithm 755 where it is verified. An output communication link 785 connects the output device 745 and the level 1 algorithm 750. The output communication link 785 carries output information to the output device 745. The output communication link 785 includes a node 790. The node 790 branches into a verification communication link 795. The verification communication link 795 connects to the level 2 algorithm 755. An enabling communication link 797 connects the output device 745, the level 2 algorithm 755, and the level 3 algorithm 760. Like before, the safety supervisor 740 is able to monitor and override when necessary the signals or commands of the controller 735. For instance, if the level 2 algorithm 755 and level 3 algorithm 760 verify the output information, the output is allowed to commence via the enabling communication link 797.

Figure 8:
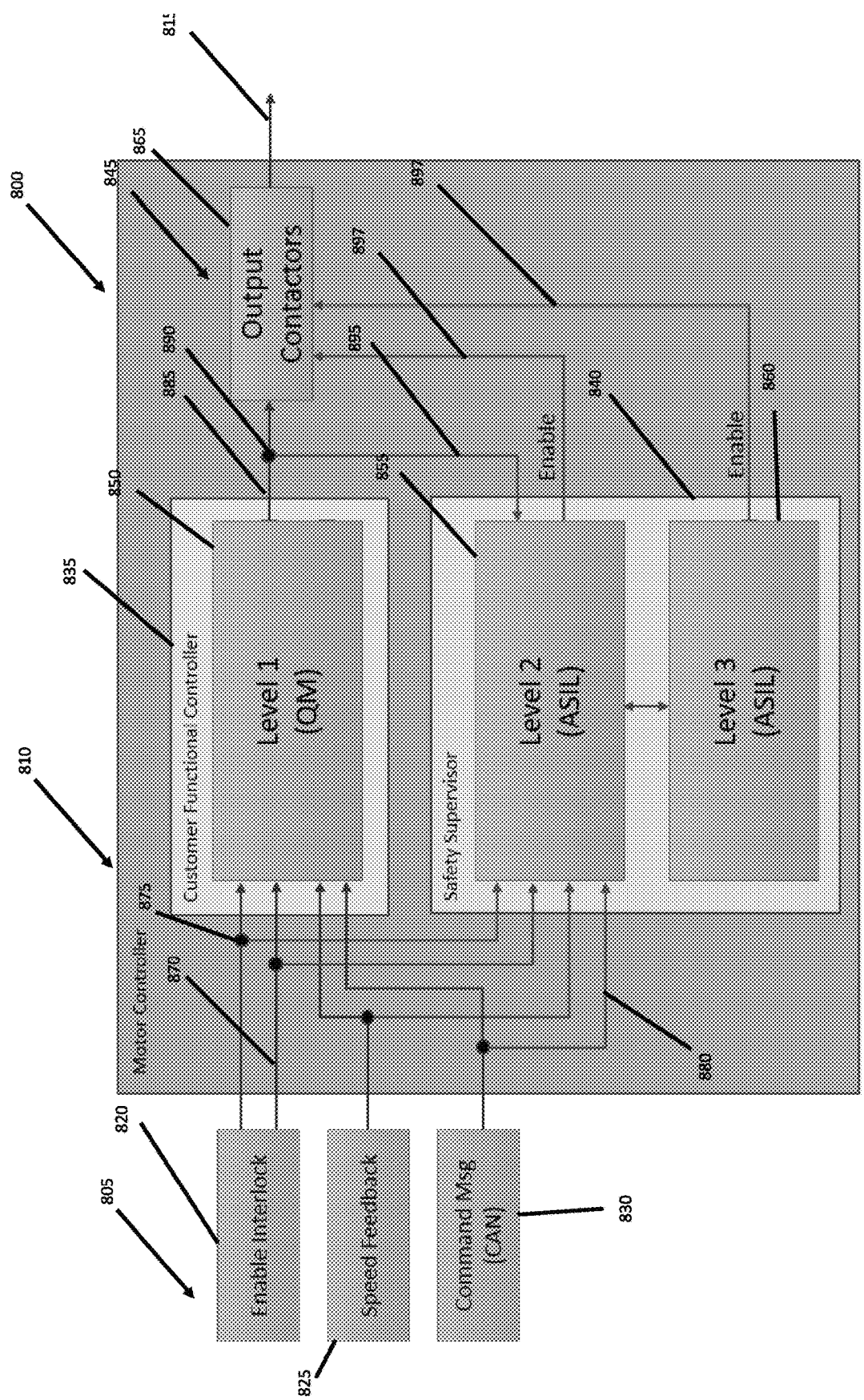
FIG. 8 is a block diagram of a motor controller system.

FIG. 8 illustrates another use case for a motor controller system 800. As depicted, the motor controller system 800 includes an input communication channel 805, a motor controller 810, and one or more outputs 815. The input communication channel 805 includes an enable interlock 820, a speed feedback 825, and a command message 830. In other examples, the input communication channel 805 may be different. The motor controller 810 includes a controller 835, a safety supervisor 840, and an output device 845. The controller 835 includes a level 1 algorithm 850. The safety supervisor 840 includes a level 2 algorithm 855 and a level 3 algorithm 860. The output device 845 includes an output contactor 865. In other examples, the output device 845 may be different. A command communication link 870 connects the input communication channel 805 and the level 1 algorithm 850. The command communication link 870 carries commands from the input communication channel 805 to the controller 835. The command communication link 870 includes one or more nodes 875. The nodes 875 branch into a safety supervisor communication link 880. The safety supervisor communication link 880 connects to the level 2 algorithm 855. The safety supervisor communication link 880 carries the command information from the input communication channel 805 to the safety supervisor 840. An output communication link 885 connects the output device 845 and the level 1 algorithm 850. The output communication link 885 carries the output commands to the output device 845 from the controller 835. The output communication link 885 includes a node 890. The node 890 branches into a verification communication link 895. The verification communication link 895 connects to the level 2 algorithm 855. An enabling communication link 897 connects the output device 845, the level 2 algorithm 855, and the level 3 algorithm 860. Once more, the safety supervisor 840 is able to monitor and override when necessary the signals or commands of the controller 835 and level 1 algorithm 850.

Figure 9:
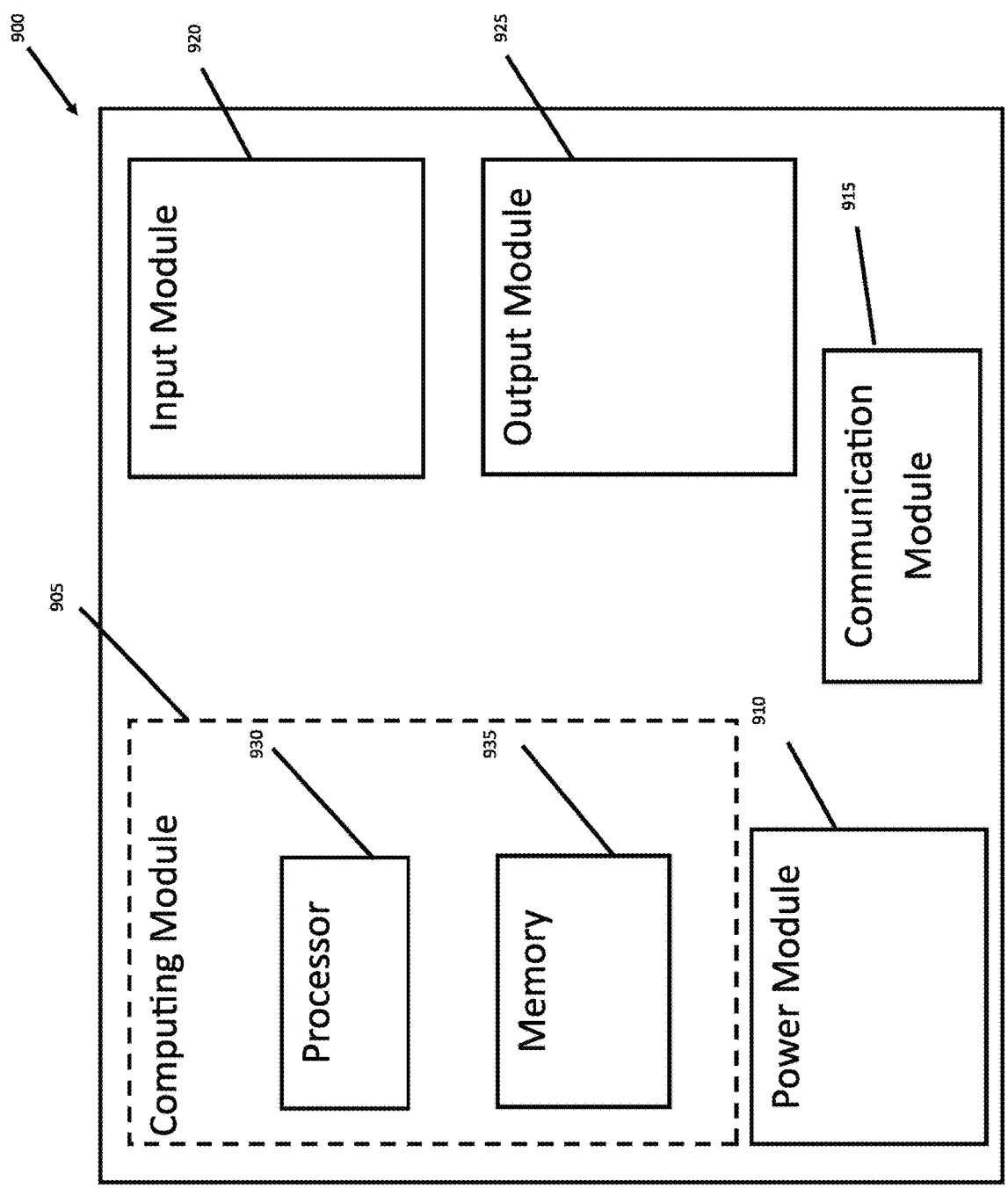
FIG. 9 is a block diagram of a computing device.

FIG. 9 shows a block diagram of some selected components for one example of the safety supervisor 415. It should be recognized that the safety supervisor 415 can include other hardware and/or software components. As shown, a computing device 900 (or controller) includes a computing module 905, a power module 910, a communication module 915, an input module 920, and an output module 925. The computing module 905 includes a processor 930 and a memory 935. It should be recognized that the various functions and routines of the safety supervisor algorithm 430 are performed using the processor 930 and memory 935 as well as other components of the computing device 900.

In one example, software on the computing device 900 is developed following AUTOSAR (AUTomotive Open System Architecture) and is developed under ISO 26262 functional safety guidelines. The ISO 26262 provides guidance on identifying hazards and associated safety goals at the vehicle level. In another variation, a functional safety system has been developed that addresses the safety of the vehicle as an intersystem solution. With a unique safety control system or safety supervisor that monitors the interaction of user inputs, vehicle outputs and vehicle systems, the safety supervisor can apply functional safety at the vehicle level. This approach allows vehicle systems that would normally be assigned as an ASIL rating to be assigned a lower ASIL or even be assigned a QM rating. This approach reduces the overall cost of a vehicle by reducing the number systems developed under ISO 26262 requirements and processes.

Figure 10:
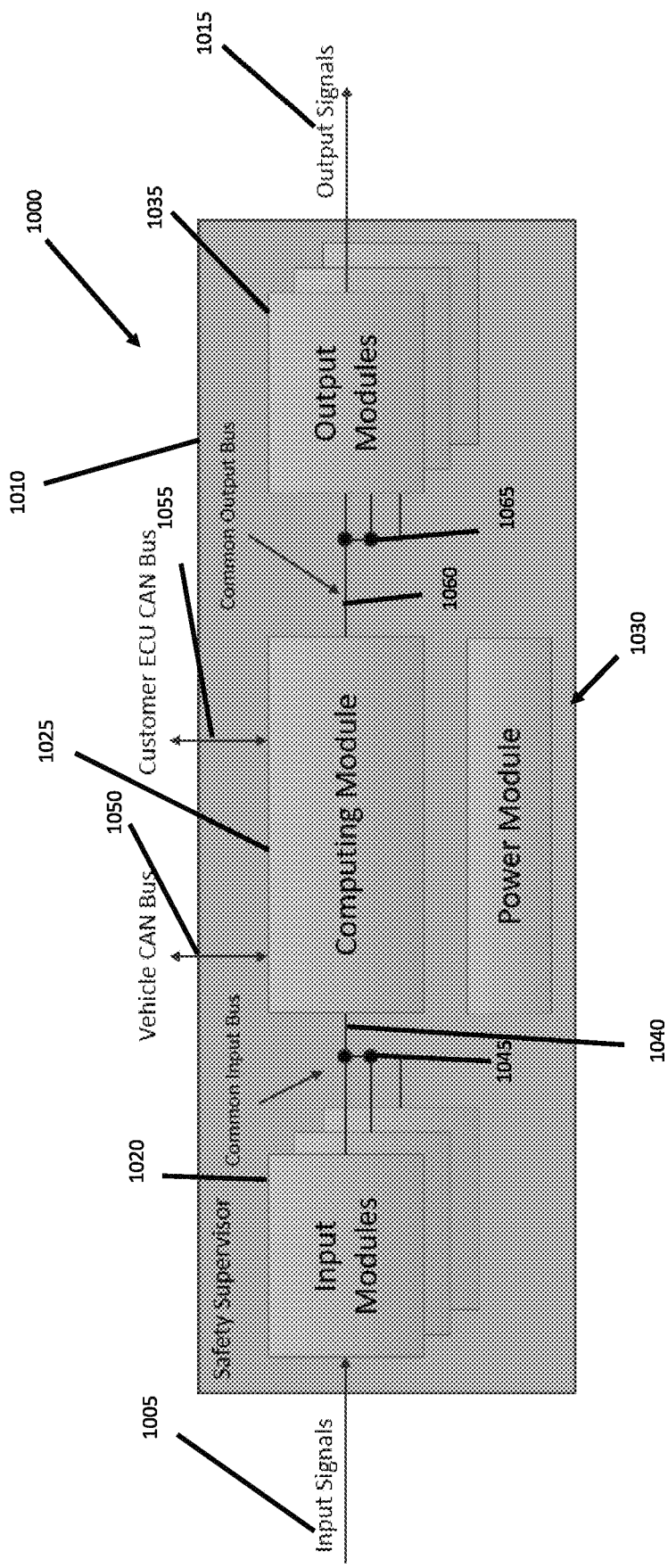
FIG. 10 is a block diagram of yet another example of a safety supervisor system.

FIG. 10 shows an example of one specific implementation of the safety supervisor system 400. As can be seen in FIG. 10, a safety supervisor system 1000 includes one or more input signals 1005, a safety supervisor 1010, and one or more output signals 1015. The safety supervisor 1010 includes one or more input modules 1020, a computing module 1025, a power module 1030, and one or more output modules 1035. The input modules 1020 provide monitoring and diagnostics of input signals 1005 and provides a trusted signal and any detected faults to the computing module 1025. The output modules 1035 provides monitoring and diagnostics of output signals 1015 and provides the computing module 1025 with any detected output faults. The power module 1030 allows the safety supervisor 1010 to be connected to different vehicle voltage buses while providing a common power interface and other system modules. The computing module 1025 can monitor vehicle communications that are relevant to the functional controller. The computing module 1025 also communicates with the functional controller to monitor the proper operation of the functional controller.

The computing module 1025 uses information from input modules 1020 and output modules 1035 as well as from the functional controller to perform rationality checks. The rationality checks verify the overall safe operation of the vehicle system. For example, if a power producing system (such as an engine controller system or traction drive system) encountered a fault where the functional controller was actuating full power while the accelerator pedal was not being applied, the safety supervisor would intervene and stop the full power output from occurring. A common input bus 1040 connects the input modules 1020 and the computing module 1025. The common input bus 1040 includes one or more nodes 1045. A vehicle control area network (CAN) bus 1050 communicates with the computing module 1025. A customer electronic control unit (ECU) control area network (CAN) bus 1055 communicates with the computing module 1025. A common output bus 1060 connects the computing module 1025 and the output modules 1035. The common output bus 1060 includes one or more nodes 1065.

Safety supervisor modules for the safety supervisor system 1000 can be separate components or can exist as design components in an Electronic Design Automation (EDA) tool which can then be quickly integrated into a single component system.

Figure 11:
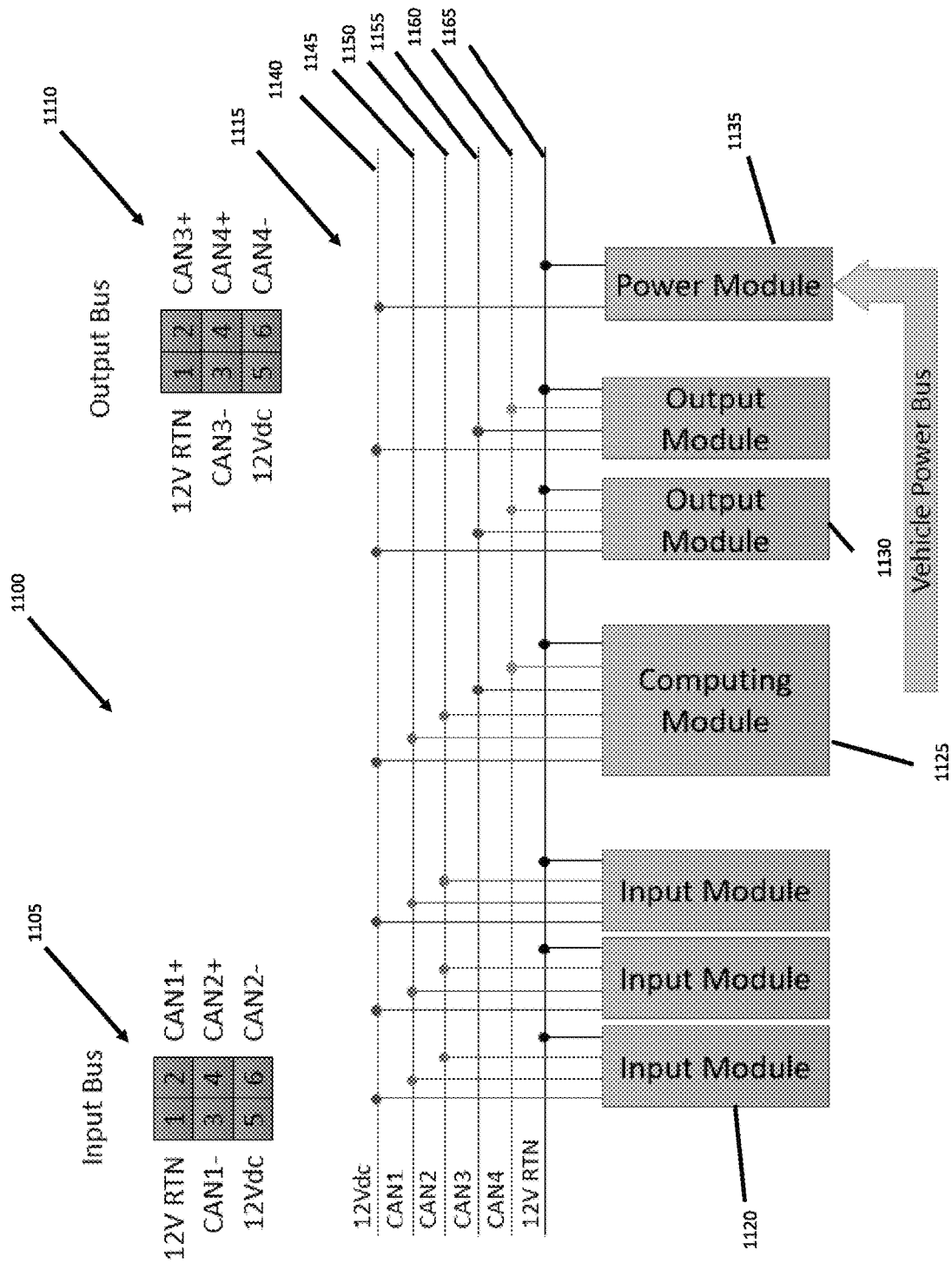
FIG. 11 is a diagram a connection schematic.

FIG. 11 shows a connection schematic 1100 of one example of how the safety supervisor 415 is connected and communicates over a CAN. As depicted, the connection schematic 1100 includes an input bus pin diagram 1105, an output bus pin diagram 1110, and a wiring diagram 1115. The input bus pin diagram 1105 and output bus pin diagram 1110 give examples of pin positions for connection to the positive and negative CAN terminals. The wiring diagram 1115 includes one or more input modules 1120, a computing module 1125, one or more output modules 1130, and a power module 1135. The safety supervisor 415 in the depicted example is implemented via the computing module 1125. The input modules 1120 connect to a DC pin 1140, a first CAN pin 1145, a second CAN pin 1150, and a DC return pin 1165. The computing module 1125 connects to the DC pin 1140, the first CAN pin 1145, the second CAN pin 1150, a third CAN pin 1155, a fourth CAN pin 1160, and the DC return pin 1165. The output modules 1130 connect to the DC pin 1140, the third CAN pin 1155, the fourth CAN pin 1160, and the DC return pin 1165. The power module 1135 connects to the DC pin 1140 and the DC return pin 1165. With this configuration, the safety supervisor 415 of the computing module 1125 is able to monitor the various inputs and outputs to and from the monitored controllers 410.

Figure 12:
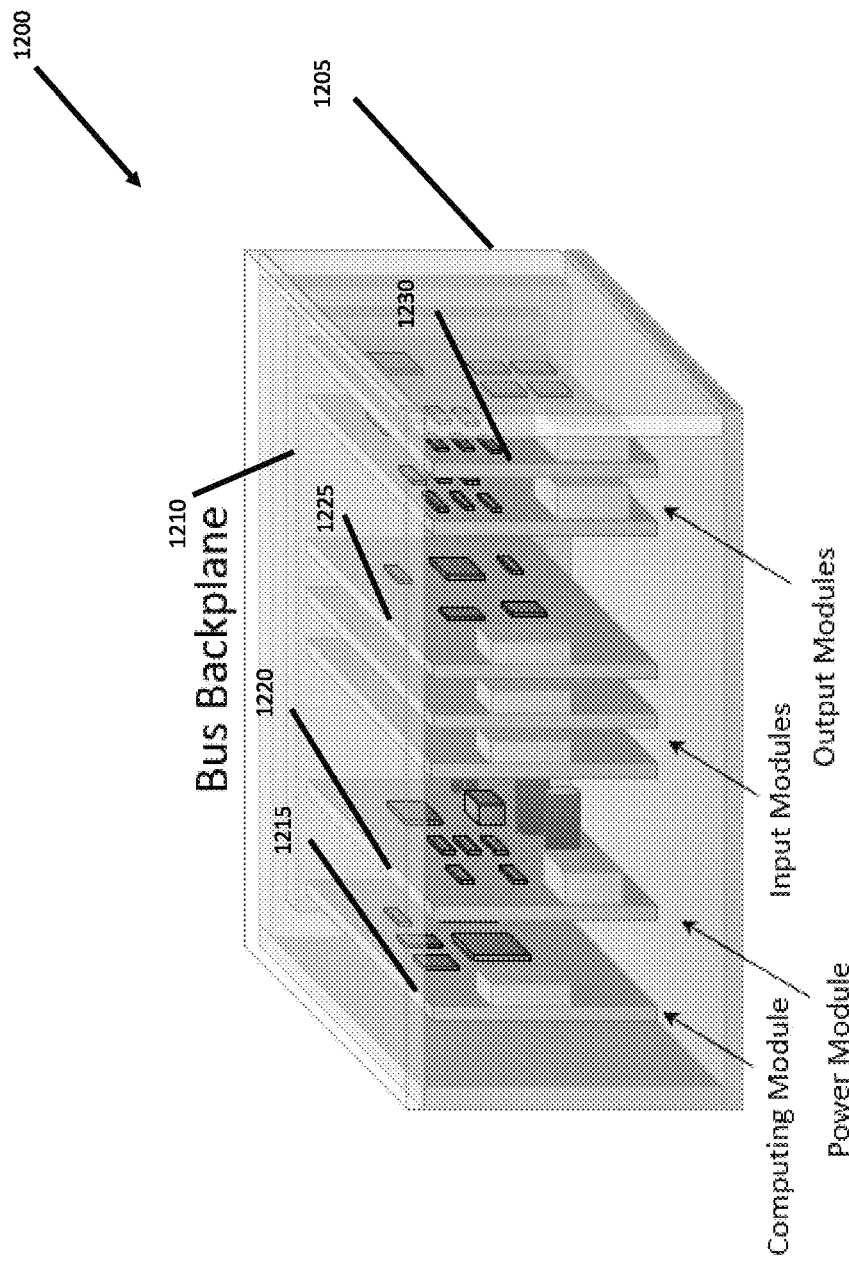
FIG. 12 is a diagrammatic view of a safety supervisor kit.

FIG. 12 shows one example hardware implementation for the safety supervisor 415. As shown, the safety supervisor 415 is in the form of a safety supervisor kit 1200 that includes a housing 1205. In one version, the housing 1205 is made from metal, and in another version, the housing 1205 is made of plastic. In yet another variation, the housing 1205 is made of a polymeric material. The housing 1205 includes a backplane system 1210. The backplane system 1210 includes a computing module card 1215, a power module card 1220, one or more input module cards 1225, and one or more output module cards 1230. The backplane system 1210 allows for intercommunication between the computing module card 1215, power module card 1220, input module cards 1225, and output module cards 1230. Furthermore, the backplane system 1210 allows one or more cards to be added or removed rapidly. As a result, the ASIL rating can be rapidly modified or changed.

Figure 13:
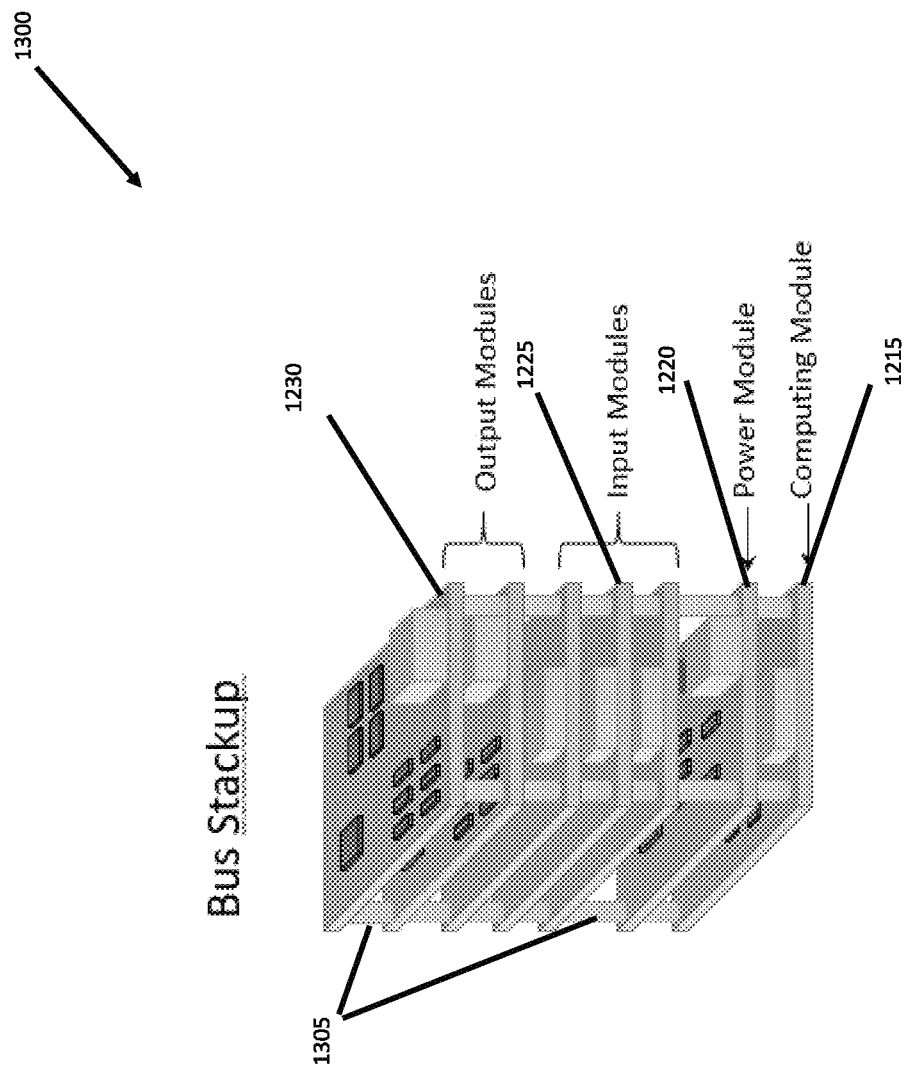
FIG. 13 is a diagrammatic view of a stacked packaging configuration.

FIG. 13 shows another example hardware implementation for the safety supervisor 415. As can be seen, the safety supervisor 415 has a stacked packaging configuration 1300. The stacked packaging configuration 1300 includes the computing module card 1215, the power module card 1220, the input module cards 1225, and the output module cards 1230 separated by one or more spacers 1305. The spacers 1305 work to maintain a distance between the individual cards and prevent electrical shorts. In one example, the spacers are plastic. In another example, the spacers are rubber. In yet another example, the spacers may be plastic with a rubber covering.

Figure 14:
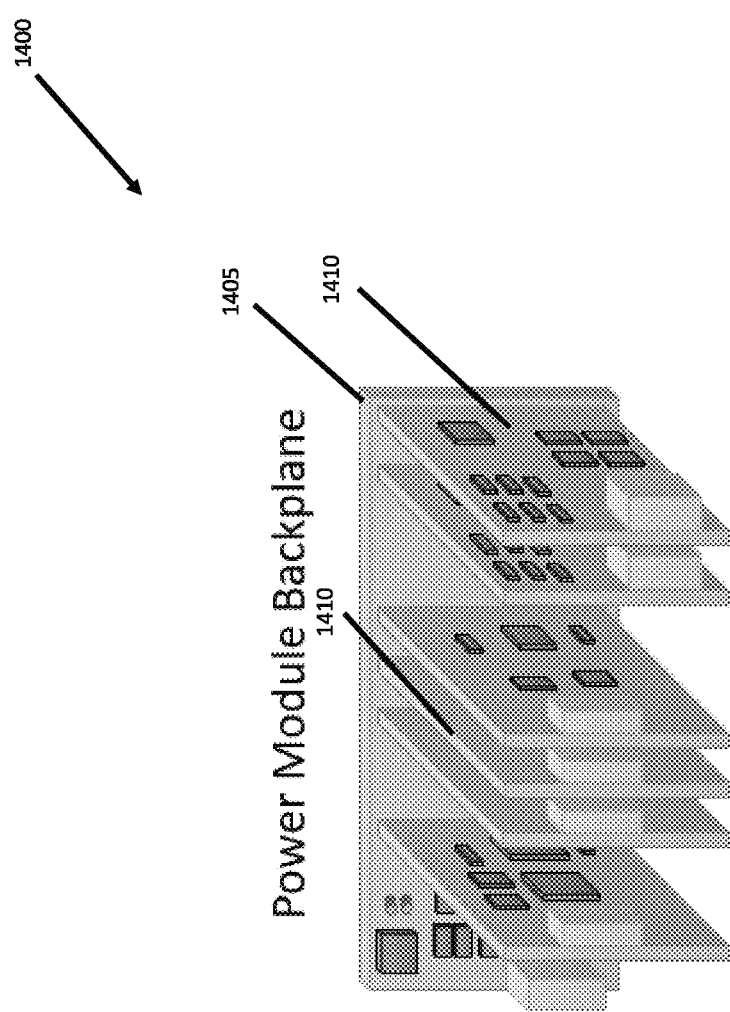
FIG. 14 is a diagrammatic view of a safety supervisor circuit board.

FIG. 14 shows still yet another example a hardware implementation for the safety supervisor 415. As illustrated, a safety supervisor circuit board 1400 includes a backplane 1405. The backplane 1405 includes one or more daughter boards 1410. As was discussed earlier, the backplane 1405 allows the safety supervisor circuit board 1400 to be rapidly changed. The modular design allows for higher or lower ASIL rated cards to be switched out as needed. The daughter boards 1410 may be any combination of computing modules, power modules, input modules, and/or output modules.

Figure 15:
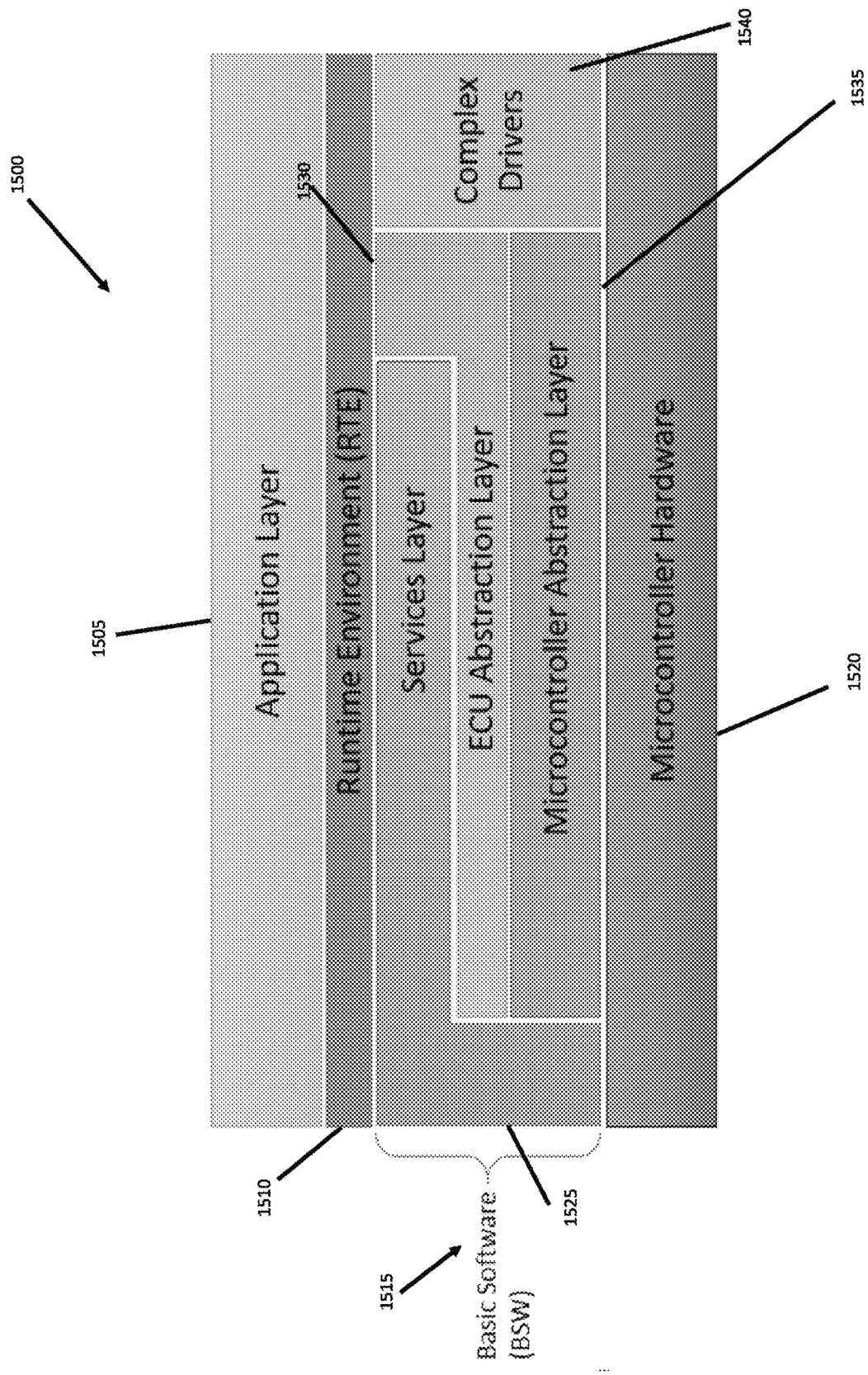
FIG. 15 is a block diagram of a safety supervisor software architecture.

As illustrated in FIG. 15, a safety supervisor software architecture 1500 includes an application layer 1505, a runtime environment 1510, a basic software 1515, and a microcontroller hardware 1520. The AUTOSAR architecture is used in the formation of the safety supervisor software architecture 1500. Furthermore, the software is formulated as layers beginning with the application layer 1505. The basic software 1515 includes a services layer 1525, an ECU abstraction layer 1530, a microcontroller abstraction layer 1535, and one or more complex drivers 1540. The runtime environment 1510 and basic software 1515 have each component developed to ASIL D stringency. Additionally, all software in the safety supervisor software architecture 1500 is developed under a safety process.

Figure 16:
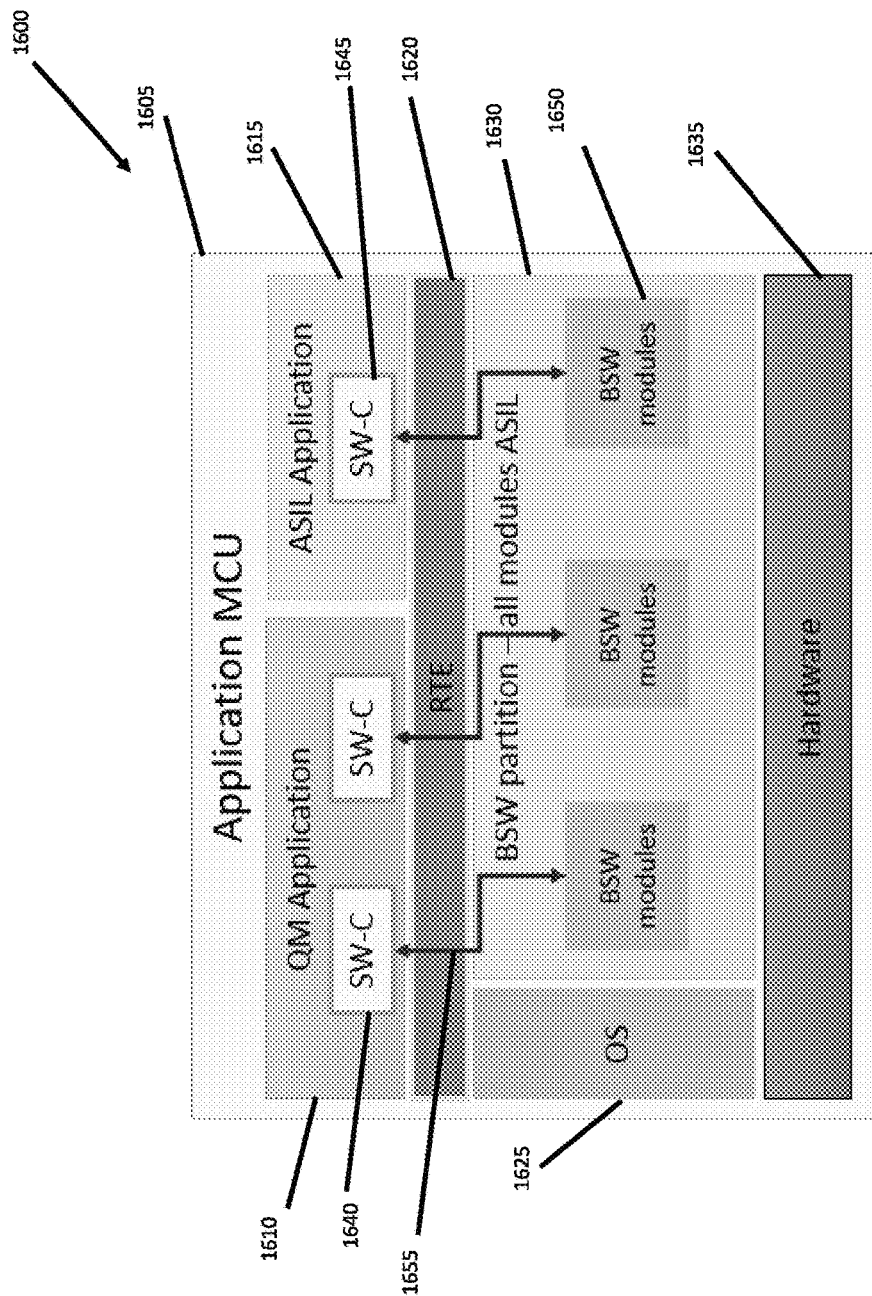
FIG. 16 is a block diagram of a safety software architecture.

FIG. 16 shows an overall software and hardware implementation schematic of the earlier approach for the controller 210 and the functional algorithms 220 depicted in FIGS. 2 and 3. As shown, a safety software architecture 1600 includes an application microcontroller unit (MCU) 1605. The application MCU 1605 includes a QM application 1610, ASIL application 1615, a runtime environment 1620, an operating software 1625, a basic software 1630, and a hardware 1635. The application MCU 1605 includes ASIL software, it is beneficial to avoid having ASIL and non-ASIL software on the same MCU. In this case, the ASIL and non-ASIL modules are partitioned in the QM application 1610 and the ASIL application 1615. However, all of the basic software 1630 is developed according to the required ASIL. The QM application 1610 includes one or more software components 1640. The ASIL application 1615 includes one or more software components 1645. The basic software 1630 includes one or more basic software modules 1650. A communication link 1655 connects the software components 1640, the software components 1645, and the basic software modules 1650. The software components 1640 and software components 1645 communicate back and forth with the basic software modules 1650. The exchange of information results in safety checks and verifications to prevent failure. With this FIG. 16 software approach, all of the code has to be generally designed to the strictest standards.

Figure 17:
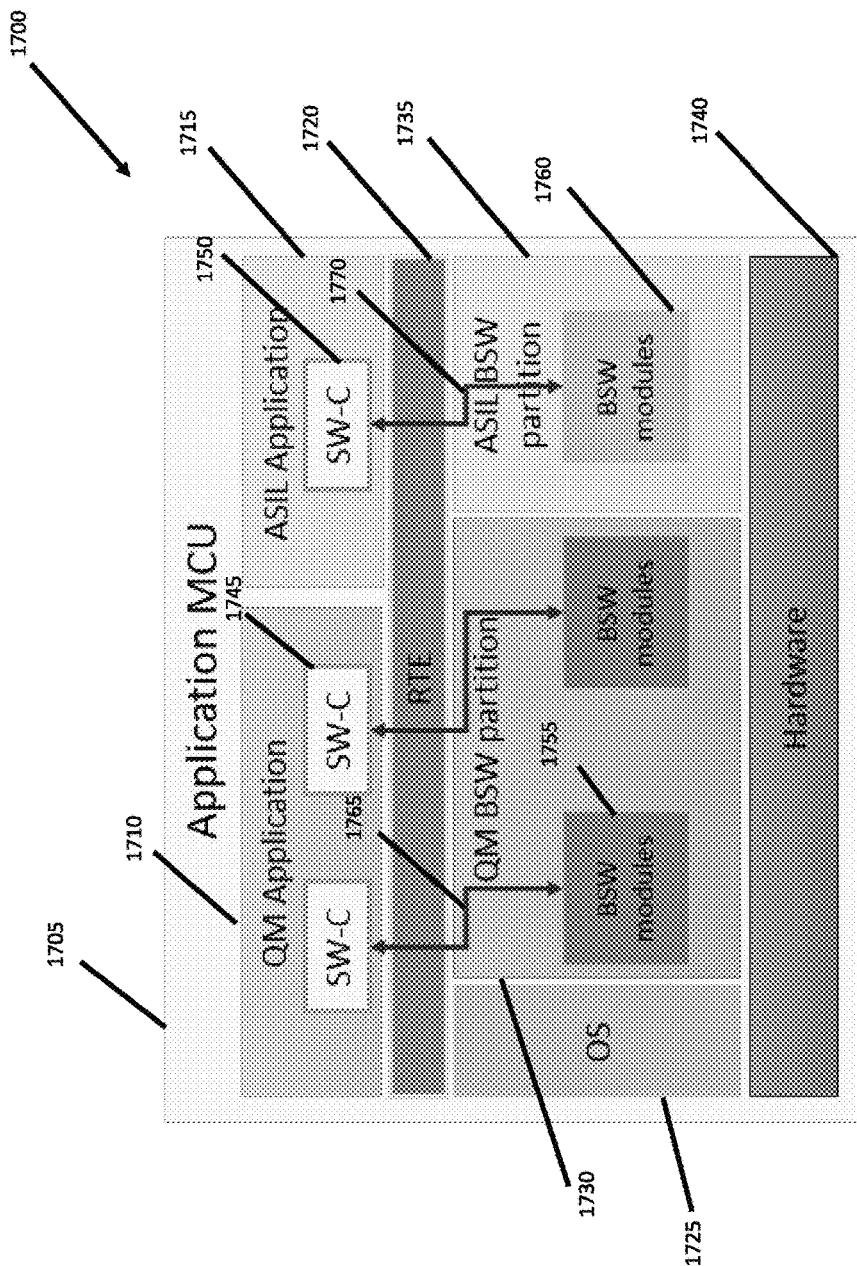
FIG. 17 is a block diagram of another example of a safety software architecture.

FIG. 17 shows an overall software and hardware implementation schematic of the earlier approach for the controller 210 and the functional algorithms 220 depicted in FIGS. 2 and 3. Looking at FIG. 17, a safety software architecture 1700 includes an application MCU 1705. The application MCU 1705 includes a QM application 1710, an ASIL application 1715, a runtime environment 1720, an operating software 1725, a QM basic software 1730, an ASIL basic software 1735, and a hardware 1740. As was described previously, the application MCU 1705 includes ASIL software and non-ASIL software. As indicated, mixing ASIL and non-ASIL software is to be avoided whenever possible. The QM application 1710 includes one or more software components 1745. The ASIL application 1715 includes one or more software components 1750. The QM basic software 1730 includes a basic software module 1755. The basic software module 1755 includes software rated for QM and not ASIL as the QM and ASIL software is separated by a partition between the QM basic software 1730 and ASIL basic software 1735. The ASIL basic software 1735 includes a basic software module 1760. The basic software module 1760 includes ASIL rated software. A communication link 1765 connects the software components 1745 and the basic software module 1755. A communication link 1770 connects the software components 1750 and the basic software module 1760. The communication link 1765 and communication link 1770 allow for communication and transfer of information between the basic software module 1755 and the software components 1745 as well as between the basic software module 1760 and the software components 1750. This system creates a more modular design environment for the software.

Figure 18:
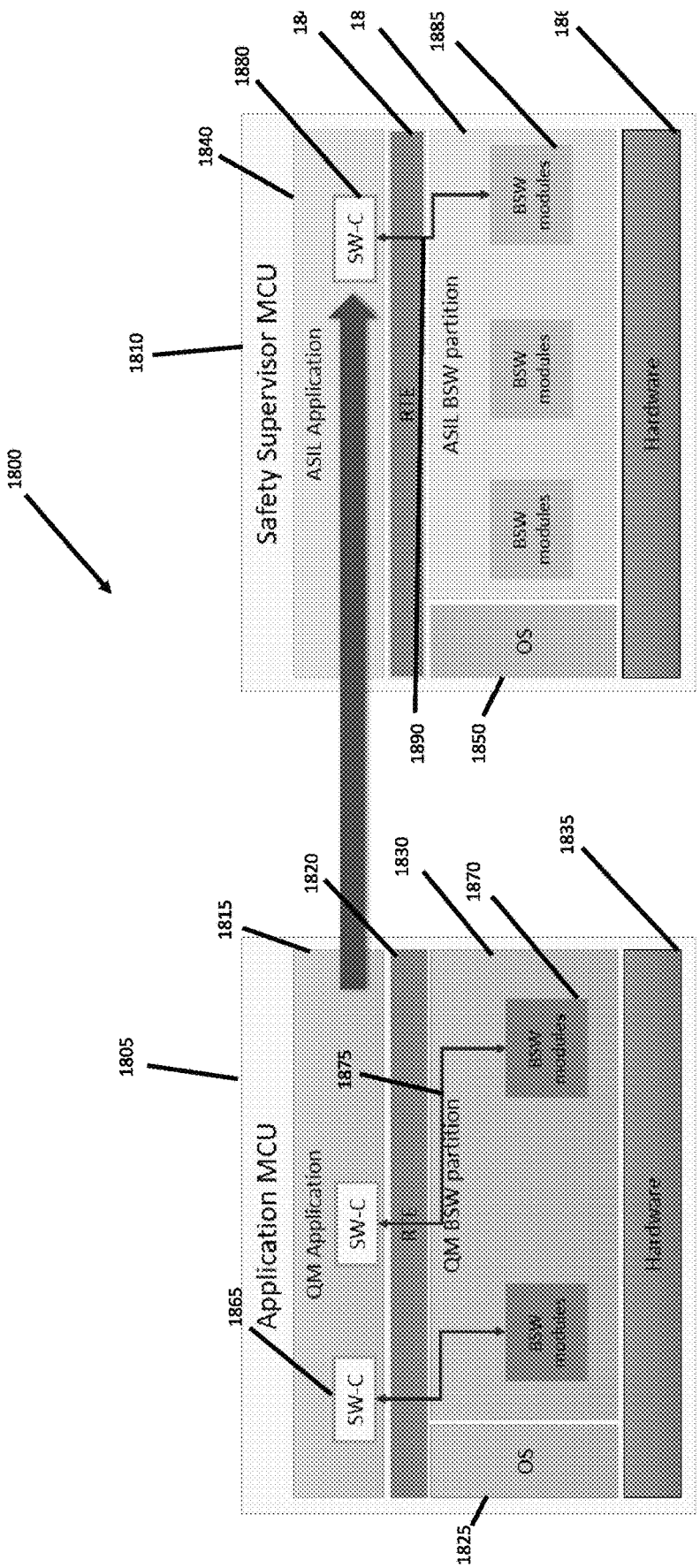
FIG. 18 is a block diagram of another example of a safety supervisor software architecture.

FIG. 18 shows a software and hardware implementation schematic of the unique approach for the safety supervisor 415 and the safety supervisor algorithm 430 depicted in FIGS. 4 and 5. As illustrated in FIG. 18, a safety supervisor software architecture 1800 includes an application MCU 1805 and a safety supervisor MCU 1810. As is shown, the application MCU 1805 and the safety supervisor MCU 1810 are completely separated. This allows the application MCU 1805 to hold the QM rated software and have no ASIL software. While the safety supervisor MCU 1810 holds all of the ASIL rated software separately. This allows for easy exchange and removal of the ASIL rated software without disturbing the application MCU 1805. The application MCU 1805 includes a QM application 1815, a runtime environment 1820, an operating software 1825, a QM basic software 1830, and a hardware 1835. The safety supervisor MCU 1810 includes an ASIL application 1840, a runtime environment 1845, an operating software 1850, an ASIL basic software 1855, and a hardware 1860. The QM application 1815 includes one or more software components 1865. The QM basic software 1830 includes a basic software module 1870. A communication link 1875 connects the software components 1865 and the basic software module 1870. The communication link 1875 allows for communication between the software components 1865 and the basic software module 1870. The ASIL application 1840 includes one or more software components 1880. The ASIL basic software 1855 includes a basic software module 1885. A communication link 1890 connects the software components 1880 and the basic software module 1885. The communication link 1890 allows for communication and verification between the software components 1880 and the basic software module 1885.

Figure 19:
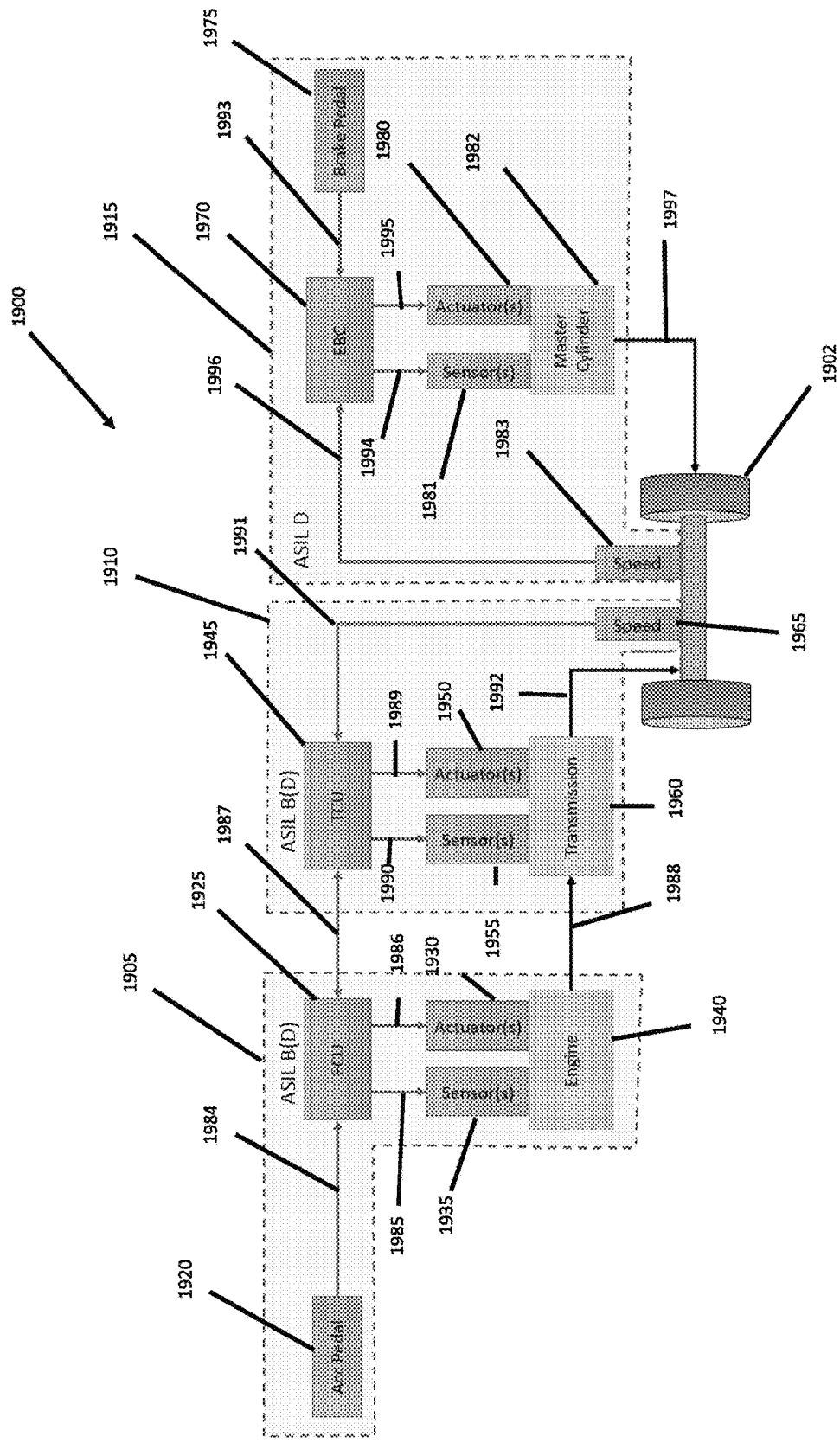
FIG. 19 is a block diagram of an acceleration safety system.

FIG. 19 depicts the more traditional approach for controlling the vehicle 100 according to the control system 200 in FIGS. 2 and 3. Referring to FIG. 19, an acceleration safety system 1900 includes one or more wheels 1902, a first ASIL section 1905, a second ASIL section 1910, and a third ASIL section 1915. As can be seen, each section of the vehicle has ASIL rated software associated with the functions. The first ASIL section 1905 includes an acceleration pedal 1920, an Engine Control Unit (ECU) 1925, one or more actuators 1930, one or more sensors 1935, and an engine 1940. The second ASIL section 1910 includes a transmission control unit (TCU) 1945, one or more actuators 1950, one or more sensors 1955, a transmission 1960, and a speed sensor 1965.

The third ASIL section 1915 includes an electronic brake control (EBC) 1970, a brake pedal 1975, one or more actuators 1980, one or more sensors 1981, a master cylinder 1982, and a speed sensor 1983.

An electrical link 1984 connects the acceleration pedal 1920 and the ECU 1925. The electrical link 1984 allows electricity to flow from the acceleration pedal 1920 to the ECU 1925 to indicate an acceleration event. An electrical link 1985 connects the ECU 1925 and the sensors 1935. An electrical link 1986 connects the ECU 1925 and the actuators 1930. The electrical link 1985 and electrical link 1986 allow electrical signals to flow from the ECU 1925 to the actuators 1930 and the sensors 1935. The information received by the sensors 1935 and actuators 1930 controls the amount of power generated by the engine 1940. A communication link 1987 connects the ECU 1925 and the TCU 1945. The communication link 1987 allows information to transfer between the ECU 1925 and the TCU 1945. The information allows the TCU 1945 to adjust according to the information sent by the ECU 1925. A mechanical link 1988 connects the engine 1940 and the transmission 1960. The mechanical link 1988 physically connects the engine 1940 and the transmission 1960 to transmit the power generated by the engine 1940 to vehicular movement.

An electrical link 1989 connects the TCU 1945 and the actuators 1950. An electrical link 1990 connects the TCU 1945 and the sensors 1955. The electrical link 1989 and electrical link 1990 allow the electrical signals from the TCU 1945 to control the movement of the actuators 1950. An electrical link 1991 connects the TCU 1945 and the speed sensor 1965. The electrical link 1991 sends signals from the speed sensor 1965 to the TCU 1945. The signals allow the TCU 1945 to understand the speed of the wheels 1902 and which gear is appropriate. A mechanical link 1992 connects the wheels 1902 and the transmission 1960. The mechanical link 1992 transmits the power from the transmission 1960 directly to the wheels 1902 to facilitate movement. An electrical link 1993 connects the EBC 1970 and the brake pedal 1975. The electrical link 1993 allows electrical communication from the brake pedal 1975 to the EBC 1970. This communication indicates to the EBC 1970 the position of the brake pedal 1975. An electrical link 1994 connects the EBC 1970 and the sensors 1981. An electrical link 1995 connects the EBC 1970 and the actuators 1980. The electrical link 1994 and the electrical link 1995 allow electrical signals to control the movement of the actuators 1980. An electrical link 1996 connects the EBC 1970 and the speed sensor 1983. The electrical link 1996 transmits electrical signals from the speed sensor 1983 to the EBC 1970. The signals give the EBC 1970 an indication of how much braking pressure is needed in order to stop or slow the vehicle. A mechanical link 1997 connects the wheels 1902 and the master cylinder 1982. The mechanical link 1997 allows the master cylinder 1982 a direct connection to the wheels 1902. The master cylinder 1982 pressurizes the brake lines to allow the vehicle to be stopped or slowed. It should be recognized that this approach requires all of the components to be designed in accordance with the highest safety standards, regardless of the safety criticality of the component.

Figure 20:
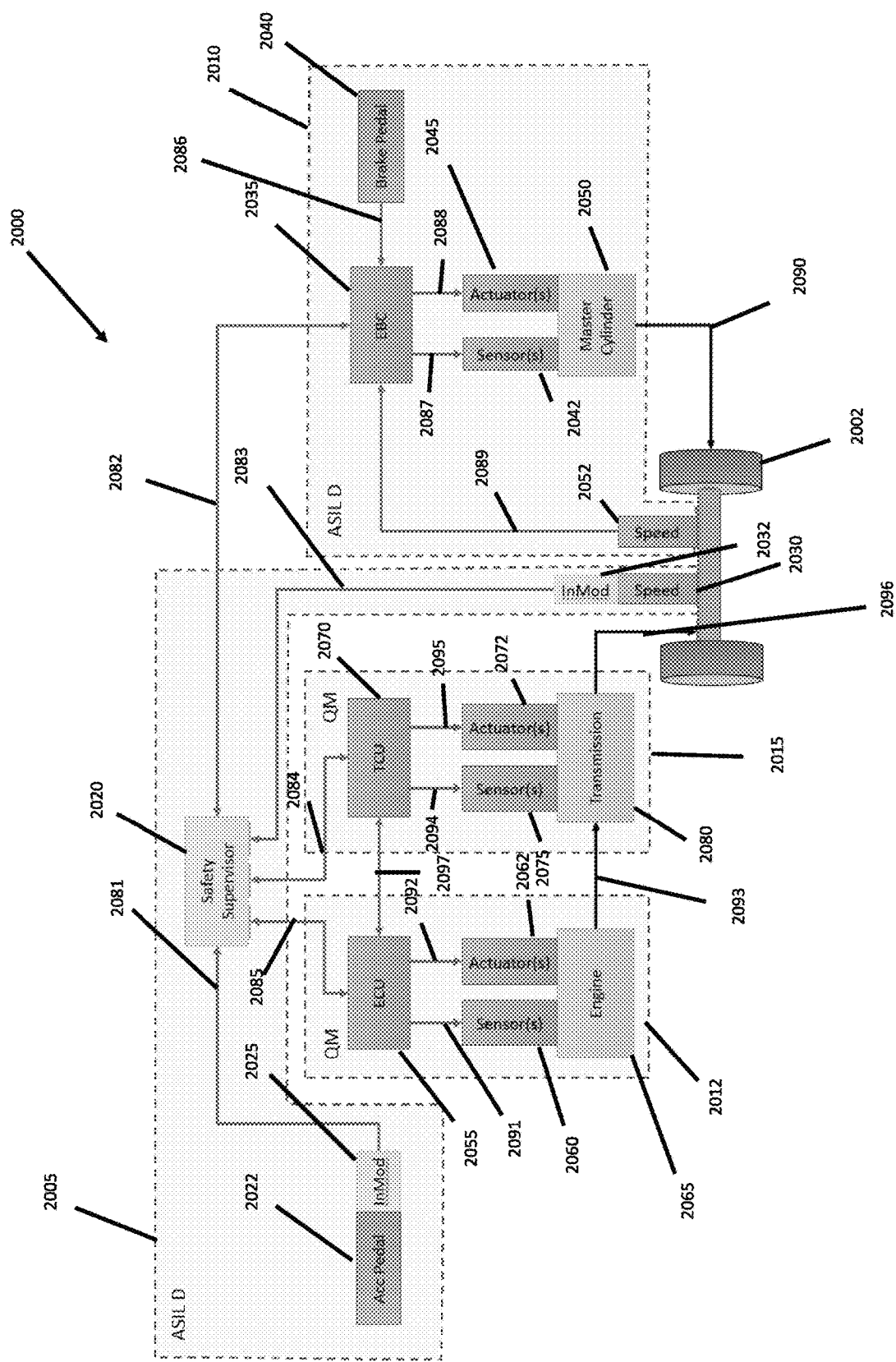
FIG. 20 is a block diagram of an acceleration safety supervisor system.

On the other hand, FIG. 20 illustrates the enhanced design approach provided by the design in accordance with the safety supervisor system 400 of FIGS. 4 and 5. As shown in FIG. 20, an acceleration safety supervisor system 2000 includes one or more wheels 2002, a first ASIL section 2005, a second ASIL section 2010, a first QM section 2012, and a second QM section 2015. As should be appreciated, the first ASIL section 2005 and second ASIL section 2010 contain ASIL rated software. In one example, the software is ASIL D rated. The first QM section 2012 and second QM section 2015 include non-ASIL or QM software only. Thus, there are no sections with cross over of ASIL and non-ASIL software.

The first ASIL section 2005 includes a safety supervisor 2020, an acceleration pedal 2022, an input modification 2025, a speed sensor 2030, and an input modification 2032. The second ASIL section 2010 includes an EBC 2035, a brake pedal 2040, one or more sensors 2042, one or more actuators 2045, a master cylinder 2050, and a speed sensor 2052. The first QM section 2012 includes an ECU 2055, one or more sensors 2060, one or more actuators 2062, and an engine 2065. The second QM section 2015 includes a TCU 2070, one or more actuators 2072, one or more sensors 2075, and a transmission 2080. A communication link 2081 connects the safety supervisor 2020 and the input modification 2025. The communication link 2081 allows communication information to pass from the input modification 2025 to the safety supervisor 2020. The safety supervisor 2020 constantly monitors the communication link 2081 for safety concerns. In the event of a safety concern, the safety supervisor 2020 places the vehicle into a safe state.

A communication link 2082 connects the safety supervisor 2020 and the EBC 2035. The communication link 2082 allows communication between the safety supervisor 2020 and the EBC 2035. Similar to before, the safety supervisor 2020 constantly monitors the communication link 2082 for a safety concern. A communication link 2083 connects the safety supervisor 2020 and the input modification 2032. The communication link 2083 allows communication between the input modification 2032 and the safety supervisor 2020. A communication link 2084 connects the safety supervisor 2020 and the TCU 2070. The communication link 2084 allows communication between the safety supervisor 2020 and the TCU 2070. A constant update of information flows along the communication link 2084 into the safety supervisor 2020 about the TCU 2070 operating status. A communication link 2085 connects the safety supervisor 2020 and the ECU 2055. Similar to the communication link 2084, the communication link 2085 constantly communicates status information back to the safety supervisor 2020. An electrical link 2086 connects the EBC 2035 and the brake pedal 2040. The electrical link 2086 allows electrical communication to flow from the brake pedal 2040 to the EBC 2035. This information indicates to the EBC 2035 the amount of braking force needed to stop or slow the vehicle.

An electrical link 2087 connects the EBC 2035 and the sensors 2042. An electrical link 2088 connects the EBC 2035 and the actuators 2045. The electrical link 2087 and the electrical link 2088 allow electrical information to be sent from the EBC 2035 to the sensors 2042 and actuators 2045. The information controls the position of the actuators 2045. An electrical link 2089 connects the EBC 2035 and the speed sensor 2052. The electrical link 2089 allows the transfer of electrical information from the speed sensor 2052 to the EBC 2035. The information informs the EBC 2035 of the amount of braking force needed to slow or stop the vehicle.

A mechanical link 2090 connects the wheels 2002 and the master cylinder 2050. The mechanical link 2090 mechanically links the master cylinder 2050 to the wheels 2002. The mechanical linkage allows for the wheels 2002 to be slowed or stopped by the braking system. An electrical link 2091 connects the ECU 2055 and the sensors 2060. An electrical link 2092 connects the ECU 2055 and the actuators 2062.

The electrical link 2091 and electrical link 2092 allow electrical information to flow from the ECU 2055 into the sensors 2060 and actuators 2062. The electrical information controls the movement of the actuators 2062. A mechanical link 2093 connects the engine 2065 and the transmission 2080. The mechanical link 2093 physically connects the engine 2065 and transmission 2080. The physical connection allows the power generated by the engine 2065 to be turned into movement by the transmission 2080. An electrical link 2094 connects the TCU 2070 and the sensors 2075. An electrical link 2095 connects the TCU 2070 and the actuators 2072. The electrical link 2094 and electrical link 2095 allow electrical communication between the TCU 2070 and the actuators 2072 and sensors 2075. The movement of the actuators 2072 is determined by the input from the TCU 2070. A mechanical link 2096 connects the wheels 2002 and the transmission 2080. The mechanical link 2096 physically connects the transmission 2080 and the wheels 2002. This connection allows the transmission 2080 to create movement in the wheels 2002 and move the vehicle. A communication link 2097 connects the ECU 2055 and the TCU 2070. The communication link 2097 allows communication between the ECU 2055 and TCU 2070. This communication allows the ECU 2055 and TCU 2070 to determine the amount of power or movement needed by the vehicle and work together to reach the proper output. In this design, only the safety supervisor 2020 needs to be designed in accordance with the strictest safety standards while the remaining do not need to be designed according to the strictest stands (but can be designed to stricter standards if desired).

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"About" with reference to numerical values generally refers to plus or minus 10% of the stated value. For example if the stated value is 4.375, then use of the term "about 4.375" generally means a range between 3.9375 and 4.8125.

"Aftermarket Product" generally refers to one or more parts and/or accessories used in repair and/or enhancement of a product already made and sold by an Original Equipment Manufacturer (OEM). For example, aftermarket products can include spare parts, accessories, and/or components for motor vehicles.

"Anti-lock Braking System" generally refers to a vehicle safety system that allows the wheels on a motor vehicle (including trailers) to maintain tractive contact with the road surface according to driver inputs while braking, preventing the wheels from locking up (ceasing rotation) and avoiding uncontrolled skidding. ABS systems automatically apply the principles of threshold braking and cadence braking albeit a much faster rate and with better control than drivers can typically manage manually. ABS systems include wheel speed sensors to detect reduced wheel rotation indicative of impending wheel lock. An ABS controller is also included that can automatically actuate the braking system to reduce braking force on the affected wheel or wheels, and to quickly reapply braking force when the danger of wheel lock is reduced. This overall feedback loop may be executed multiple times a second resulting in rapid activation and deactivation of braking force or "pulsing" of the brakes. Maximum braking force is obtained with approximately 10-20% slippage between the braked wheel's rotational speed and the road surface. Beyond this point, rolling grip diminishes rapidly and sliding friction provides a greater proportion of the force that slows the vehicle. Due to local heating and melting of the tires, the sliding friction can be very low. When braking at, or beyond, the peak braking force, steering input is largely ineffective since the grip of the tire is entirely consumed in braking the vehicle. Threshold braking seeks to obtain peak friction by maintaining the maximum braking force possible without allowing wheels to slip excessively. Braking beyond the slipping point causes tires to slide and the frictional adhesion between the tire and driving surface is thus reduced. The aim of threshold braking is to keep the amount of tire slip at the optimal amount, the value that produces the maximum frictional, and thus braking force. When wheels are slipping significantly (kinetic friction), the amount of friction available for braking is typically substantially less than when the wheels are not slipping (static friction), thereby reducing the braking force. Peak friction occurs between the static and dynamic endpoints, and this is the point that threshold braking tries to maintain. "Cadence" braking or "stutter" braking involves pumping the brake pedal and is used to allow a car to both steer and brake on a slippery surface. ABS systems generally provide this behavior automatically and at a much higher rate than most drivers can manually produce. It is used to effect an emergency stop where traction is limited to reduce the effect of skidding from road wheels locking up under braking. This can be a particular problem when different tires have different traction, such as on patchy ice for example. Cadence braking maximizes the time for the driver to steer around the obstacle ahead, as it allows the driver to steer while slowing. ABS generally offers improved vehicle control and decreases stopping distances on dry and slippery surfaces; however, on loose gravel or snow-covered surfaces, ABS can significantly increase braking distance, although still improving vehicle steering control.

"Bandwidth" generally refers to the maximum throughput of a logical or physical communication path in a communication system. Bandwidth is a transfer rate that can be expressed in units of data transferred per second. In a digital communications network, the units of data transferred are bits and the maximum throughput of a digital communications network is therefore generally expressed in "bits per second" or "bit/s." By extension, the terms "kilobit/s" or "Kbit/s", "Megabit/s" or "Mbit/s", and "Gigabit/s" or "Gbit/s" can also be used to express the bandwidth of a given digital communications network. Data networks may be rated according to their bandwidth performance characteristics according to specific metrics such as "peak bit rate", "mean bit rate", "maximum sustained bit rate", "information rate", or "physical layer useful bit rate." For example, bandwidth tests measure the maximum throughput of a computer network. The reason for this usage is that according to Hartley's Law, the maximum data rate of a physical communication link is proportional to its frequency bandwidth in hertz. Bandwidth may also be characterized according to the maximum transfer rate for a particular communications network.

"Brake" generally refers to a device for arresting and/or preventing the motion of a mechanism usually via friction, electromagnetic, and/or other forces. Brakes for example can include equipment in automobiles, bicycles, or other vehicles that are used to slow down and/or stop the vehicle. In other words, a brake is a mechanical device that inhibits motion by absorbing energy from a moving system. The brake can be for example used for slowing or stopping a moving vehicle, wheel, and/or axle, or to prevent its motion. Most often, this is accomplished by friction. Types of brakes include frictional, pressure, and/or electromagnetic type braking systems. Frictional brakes for instance can include caliper, drum, and/or disc drakes. Electromagnetic braking systems for example can include electrical motor/generators found in regenerative braking systems.

"Cable" generally refers to one or more elongate strands of material that may be used to carry electromagnetic or electrical energy. A metallic or other electrically conductive material may be used to carry electric current. In another example, strands of glass, acrylic, or other substantially transparent material may be included in a cable for carrying light such as in a fiber-optic cable. A cable may include connectors at each end of the elongate strands for connecting to other cables to provide additional length. A cable is generally synonymous with a node in an electrical circuit and provides connectivity between elements in a circuit but does not include circuit elements. Any voltage drop across a cable is therefore a function of the overall resistance of the material used. A cable may include a sheath or layer surrounding the cable with electrically non-conductive material to electrically insulate the cable from inadvertently electrically connecting with other conductive material adjacent the cable. A cable may include multiple individual component cables, wires, or strands, each with, or without, a non-conductive sheathing. A cable may also include a non-conductive sheath or layer around the conductive material, as well as one or more layers of conductive shielding material around the non-conductive sheath to capture stray electromagnetic energy that may be transmitted by electromagnet signals traveling along the conductive material of the cable, and to insulate the cable from stray electromagnetic energy that may be present in the environment the cable is passing through. Examples of cables include twisted pair cable, coaxial cable, "twin-lead", fiber-optic cable, hybrid optical and electrical cable, ribbon cables with multiple side-by-side wires, and the like.

"Cellular Device" generally refers to a device which sends or receives data, and/or sends or receives telephone calls using a cellular network. Cellular devices may thus be characterized as nodes in a communications link operating as an originating and/or final receiving node. A cellular device transmits to and receives from a cellular transceiver located in the cell (e.g. at a base unit or "cell tower.") Radio waves are generally used to transfer signals to and from the cellular device on a frequency that is specific (but not necessarily unique) to each cell. A cellular device may include a computer with memory, processor, display device, input/output devices, and so forth, and thus may be used as, and referred to as, a personal computing device.

"Cellular Network" or "Mobile Network" generally refers to a communications link or communications network where the final communications link to an originating sending node or final receiving node in the network is via a wireless link. The cellular network is distributed over land areas ("cells"), each cell served by at least one fixed-location transceiver known as a cell site, base station, or generically, a "cell tower". This base station provides the cell with the network coverage which can be used for transmission of voice, data and other types of communication. In a cellular network, each cell uses a different set of frequencies from neighboring cells, to avoid interference and provide guaranteed bandwidth within each cell. In a cellular network, switching from one cell frequency to a different cell frequency is done electronically without interruption as various mobile devices with transceivers configured to communicate with the network (i.e. the originating or final receiver nodes) move from cell to cell during an ongoing continuous communication, all generally without a base station operator or manual switching. This is called the "handover" or "handoff." Typically, a new channel is automatically selected for the mobile device on the new base station which will serve it as the mobile device moves around in the cell. The mobile unit then automatically switches from the current channel to the new channel and communication continues. The most common example of a cellular network is a mobile phone (cell phone) network.

"Chassis" generally refers to an internal frame and/or supporting structure that supports an external object, body, and/or housing of the vehicle and/or electronic device. In one form, the chassis can further provide protection for internal parts of the vehicle and/or electronic device. By way of non-limiting examples, a chassis can include the underpart of a vehicle, including the frame on which the body is mounted. In an electronic device, the chassis for example includes a frame and/or other internal supporting structure on which one or more circuit boards and/or other electronics are mounted.

"Cloud-based application" generally refers to any program stored on a remote server or group of servers and that is accessible by a network, such as the Internet. The program can be designed to perform any desired function and may be accessible by any device that is capable of accessing the network.

"Communications Cable" generally refers to a cable configured to carry digital or analog signals.

"Communications Link" generally refers to a connection between two or more communicating entities and may or may not include a communications channel between the communicating entities. The communication between the communicating entities may occur by any suitable means. For example, the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space via one or more sending and receiving antennas, or any combination thereof. Electromagnetic waves may be passed at any suitable frequency including any frequency in the electromagnetic spectrum. A communication link may include any suitable combination of hardware which may include software components as well. Such hardware may include routers, switches, networking endpoints, repeaters, signal strength enters, hubs, and the like. In the case of a logical link, the communication link may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus, a computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible. Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Controller" generally refers to a device, using mechanical, hydraulic, pneumatic electronic techniques, and/or a microprocessor or computer, which monitors and physically alters the operating conditions of a given dynamical system. In one non-limiting example, the controller can include an Allen Bradley brand Programmable Logic Controller (PLC). A controller may include a processor for performing calculations to process input or output. A controller may include a memory for storing values to be processed by the processor, or for storing the results of previous processing. A controller may also be configured to accept input and output from a wide array of input and output devices for receiving or sending values. Such devices include other computers, keyboards, mice, visual displays, printers, industrial equipment, and systems or machinery of all types and sizes. For example, a controller can control a network or network interface to perform various network communications upon request. The network interface may be part of the controller, or characterized as separate and remote from the controller. A controller may be a single, physical, computing device such as a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller may also be connected to a wider network such as the Internet. Thus, a controller may include one or more physical processors or other computing devices or circuitry, and may also include any suitable type of memory. A controller may also be a virtual computing platform having an unknown or fluctuating number of physical processors and memories or memory devices. A controller may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Controller Area Network" or "CAN" generally refers to a vehicle bus standard designed to allow microcontrollers, sensors, and/or other devices to communicate with each other in applications without necessarily a host computer. CAN systems include a message-based protocol, designed originally for multiplex electrical wiring within automobiles, but is also used in many other contexts. A vehicle with a CAN system may normally, but not always, includes multiple Electronic Control Units (ECUs) which can be also called nodes. These ECUs can include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. A CAN includes a multi-master serial bus standard for connecting ECUs. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and transceiver. The CAN systems can for example include low speed CAN (128 Kbps) under the ISO 11898-3 standard, high speed CAN (512 Kbps) under the ISO 11898-2 standard, CAN FD under the ISO 11898-1 standard, and single wire CAN under the SAE J2411 standard.

"Couple" or "Coupled" generally refers to an indirect and/or direct connection between the identified elements, components, and/or objects. Often the manner of the coupling will be related specifically to the manner in which the two coupled elements interact.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour. Data may be organized and represented in a structured format. Examples include a tabular representation using rows and columns, a tree representation with a set of nodes considered to have a parent-children relationship, or a graph representation as a set of connected nodes to name a few. The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Display" or "Display Device" generally refers to any device capable of being controlled by an electronic circuit or processor to display information in a visual or tactile manner. A display device may be configured as an input device taking input from a user or other system (e.g. a touch sensitive computer screen), or as an output device generating visual or tactile information, or the display device may be configured to operate as both an input or output device at the same time, or at different times. The output may be two-dimensional, three-dimensional, and/or mechanical displays and includes, but is not limited to, the following display technologies: Cathode Ray Tube display (CRT), Light-Emitting Diode display (LED), Electroluminescent Display (ELD), electronic paper, Electrophoretic Ink (E-ink), Plasma Display Panel (PDP), Liquid Crystal Display (LCD), High-Performance Addressing display (HPA), Thin-film Transistor display (TFT), Organic Light-Emitting Diode display (OLED), Surface-conduction Electron-emitter Display (SED), laser TV, carbon nanotubes, quantum dot display, Interferometric Modulator Display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, and/or an array of red, yellow, and green indicators configured to indicate a temperature range.

"Electrical Connection" means here a connection between two objects that allows a flow of electric current and/or electric signals.

"Electronic Control Unit (ECU)" or "Electronic Control Module (ECM)" generally refers to an embedded system in electronics of a vehicle that controls one or more electrical systems and/or subsystems of the vehicle. Usually, but not always, ECUs communicate over a Controller Area Network (CAN) and can act as nodes over the CAN. The complexity of the ECU or node can range from a simple Input/Output (I/O) device up to an embedded computer with a CAN interface and software. The ECU or node can also act as a gateway allowing a general purpose computer to communicate over an interface, such as via a USB and/or Ethernet port, to the devices on the CAN network. Each ECU usually, but not always, includes a central processing unit, a CAN controller, and a transceiver. These ECUs can for instance include Engine Control Modules (ECMs) and Transmission Control Modules (TCMs) as well as other control units such as for airbags, antilock braking/ABS, cruise control, electric power steering, audio systems, power windows, doors, mirror adjustment, battery and/or hybrid/electric recharging systems, to name just a few. By way of non-limiting examples, types of ECUs can include ECMs, TCMs, Powertrain Control Module (PCMs), Brake Control Modules (BCMs or EBCMs), Central Control Modules (CCMs), Central Timing Modules (CTMs), General Electronic Modules (GEMs), Body Control Modules (BCMs), and/or Suspension Control Modules (SCMs), to name just a few.

"Energy Source" generally refers to a device, structure, mechanism, and/or system that provides power for performing work. The energy supplied by the energy source can take many forms including electrical, chemical, electrochemical, nuclear, hydraulic, pneumatic, gravitational, kinetic, and/or potential energy forms. The energy source for instance can include ambient energy sources, such as solar panels, external energy sources, such as from electrical power transmission networks, and/or portable energy sources, such as batteries. The energy source can include an energy carrier containing energy that can be later converted to other forms, such as into mechanical, heat, electrical, and/or chemical forms. Energy carriers can for instance include springs, electrical batteries, capacitors, pressurized air, dammed water, hydrogen, petroleum, coal, wood, and/or natural gas, to name just a few.

"Fastener" generally refers to a hardware device that mechanically joins or otherwise affixes two or more objects together. By way of non-limiting examples, the fastener can include bolts, dowels, nails, nuts, pegs, pins, rivets, screws, and snap fasteners, to just name a few.

"Frame" generally refers to a structure that forms part of an object and gives strength and/or shape to the object.

"Ground" or "Circuit Ground" generally refers to a node in an electrical circuit that is designated as a reference node for other nodes in a circuit. It is a reference point in an electrical circuit from which voltages are measured, a common return path for electric current, and/or a direct physical connection to the Earth.

"Guidance, Navigation and Control System" (GNC) generally refers to systems to control the movement of vehicles, especially, automobiles, ships, aircraft, and spacecraft. In many cases these functions can be performed by trained humans. However, because of the speed of, for example, a rocket's dynamics, human reaction time is too slow to control this movement. Therefore, systems—now almost exclusively digital electronic—are used for such control. Even in cases where humans can perform these functions, it is often the case that GNC systems provide benefits such as alleviating operator workload, smoothing turbulence, fuel savings, etc. In addition, sophisticated applications of GNC enable automatic or remote control.

"Inductive Charging" generally refers to a type of Wireless Power Transfer (WPT) that uses of an electromagnetic field to transfer energy between two objects through electromagnetic induction. Typically, but not always, inductive charging is performed through a charging station. Energy is sent through an inductive coupling to an electrical device, and the transferred energy is then for example used to charge batteries and/or run the device. Induction chargers commonly use a primary induction coil at a power transmitter to create an alternating electromagnetic field from within a charging base, and a secondary induction coil in a power receiver of the portable device or other electrical load takes power from the electromagnetic field and converts the electromagnetic energy back into electric current to charge the battery and/or power the electrical load. In essence, the two induction coils in proximity combine to form an electrical transformer. Greater distances between the coils can be achieved when the wireless charging system uses resonant inductive coupling. For stationary type chargers, inductive charging occurs while the electrical load is stationary relative to the primary coil. Inductive charging in other forms can occur while the vehicle or electrical load is moving relative to the primary coil.

"Input Device" generally refers to any device coupled to a computer that is configured to receive input and deliver the input to a processor, memory, or other part of the computer. Such input devices can include keyboards, mice, trackballs, and touch sensitive pointing devices such as touchpads or touchscreens. Input devices also include any sensor or sensor array for detecting environmental conditions such as temperature, light, noise, vibration, humidity, and the like.

"Input/Output (I/O) Device" generally refers to any device or collection of devices coupled to a computing device that is configured to receive input and deliver the input to a processor, memory, or other part of the computing device and/or is controlled by the computing device to produce an output. The I/O device can include physically separate input and output devices, or the input and output devices can be combined together to form a single physical unit. Such input devices of the I/O device can include keyboards, mice, trackballs, and touch sensitive pointing devices such as touchpads or touchscreens. Input devices also include any sensor or sensor array for detecting environmental conditions such as temperature, light, noise, vibration, humidity, and the like. Examples of output devices for the I/O device include, but are not limited to, screens or monitors displaying graphical output, a projecting device projecting a two-dimensional or three-dimensional image, or any kind of printer, plotter, or similar device producing either two-dimensional or three-dimensional representations of the output fixed in any tangible medium (e.g., a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Insulator" or "Insulative Material" generally refers to a material and/or object whose internal electric charges do not flow freely such that very little electric current will flow through the material under the influence of an electric field under normal operating conditions. By way of non-limiting examples, insulator materials include materials having high resistivity, such as glass, paper, ceramics, rubber, and plastics.

"Lateral" generally refers to being situated on, directed toward, or coming from the side.

"Longitudinal" generally refers to the length or lengthwise dimension of an object, rather than across.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM). Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Microcontroller" or "MCU" generally refers to a small computer on a single integrated circuit. It may be similar to, but less sophisticated than, a System on a Chip or "SoC"; a SoC may include a microcontroller as one of its components. A microcontroller may contain one or more CPUs (processor cores) along with memory and programmable input/output peripherals. Program memory in the form of ferroelectric RAM, NOR flash or OTP ROM may also be included on the chip, as well as a small amount of RAM. Microcontrollers may be designed for embedded applications, in contrast to the microprocessors used in personal computers or other general purpose applications consisting of various discrete chips. Microcontrollers may be included in automatically controlled products and devices, such as automobile engine control systems, implantable medical devices, remote controls, office machines, appliances, power tools, toys and other embedded systems. An MCU may be configured to handle mixed signals thus integrating analog components needed to control non-digital electronic systems. Some microcontrollers may use four-bit words and operate at frequencies as low as 4 kHz, for low power consumption (single-digit milliwatts or microwatts). They will generally have the ability to retain functionality while waiting for an event such as a button press or other interrupt; power consumption while sleeping (CPU clock and most peripherals off) may be just nanowatts, making many of them well suited for long lasting battery applications. Other microcontrollers may serve performance roles, where they may need to act more like a Digital Signal Processor (DSP), with higher clock speeds and power consumption. A microcontroller may include any suitable combination of circuits such as: 1. a central processing unit—ranging from small and simple processors with registers as small as 4 bits or list, to complex processors with registers that are 32, 64, or more bits 2. volatile memory (RAM) for data storage 3. ROM, EPROM, EEPROM or Flash memory for program and operating parameter storage 4. discrete input and output bits, allowing control or detection of the logic state of an individual package pin 5. serial input/output such as serial ports (UARTs) 6. other serial communications interfaces like I²C, Serial Peripheral Interface and Controller Area Network for system interconnect 7. peripherals such as timers, event counters, PWM generators, and watchdog 8. clock generator—often an oscillator for a quartz timing crystal, resonator or RC circuit 9. many include analog-to-digital converters, some include digital-to-analog converters 10. in-circuit programming and in-circuit debugging support "Modulation" generally refers to a process of varying one or more properties of a signal using a separate signal that typically contains information to be transmitted. It may be thought of as merging the properties of two time-varying signals to create a third output signal that is the combination of both input signals. Modulation is useful in the process of conveying data, such as in the case of transmitting a digital bit stream or an analog (continuously varying) signal using electromagnetic energy. Analog modulation may transfer an analog baseband (or low pass) signal, for example an audio signal or TV signal, over an analog bandpass channel at a different frequency, for example over a limited radio frequency band or a cable TV network channel. Digital modulation may transfer a digital bit stream over an analog communication channel, for example over the public switched telephone network (where a bandpass filter limits the frequency range to 300-3400 Hz) or over a limited radio frequency band. Analog and digital modulation facilitate Frequency Division Multiplexing (FDM), where several low pass information signals are transferred simultaneously over the same shared physical medium, using different carrier frequencies. Digital baseband modulation, also known as "line coding", can transfer a digital bit stream over a baseband channel, typically a non-filtered copper wire such as a serial bus or a wired local area network. Pulse modulation may transfer a narrowband analog signal, for example, a phone call over a wideband baseband channel or, in some of the schemes, as a bit stream over another digital transmission system. As used herein, analog modulation techniques may include, but are not limited to, any of the following alone or in combination: 1. Amplitude modulation (AM) (here the amplitude of the carrier signal is varied in accordance with the instantaneous amplitude of the modulating signal) 2. Double-sideband modulation with carrier (DSB-WC) (used on the AM radio broadcasting band) 3. Double-sideband suppressed-carrier transmission (DSB-SC) 4. Double-sideband reduced carrier transmission (DSB-RC) 5. Single-sideband modulation with carrier (SSB-WC) 6. Single-sideband modulation suppressed carrier modulation (SSB-SC) 7. Vestigial sideband modulation (VSB, or VSB-AM) 8. Quadrature amplitude modulation (QAM) 9. Frequency modulation (FM) (here the frequency of the carrier signal is varied in accordance with the instantaneous amplitude of the modulating signal) 10. Phase modulation (PM) (here the phase shift of the carrier signal is varied in accordance with the instantaneous amplitude of the modulating signal) 11. Transpositional Modulation (TM), in which the waveform inflection is modified resulting in a signal where each quarter cycle is transposed in the modulation process. In digital modulation, an analog carrier signal may be modulated by a discrete signal. Digital modulation methods can be considered as digital-to-analog conversion and the corresponding demodulation or detection as analog-to-digital conversion. The changes in the carrier signal are chosen from a finite number of M alternative symbols (the modulation alphabet). As used herein, digital modulation techniques may include, but are not limited to, any of the following used either alone or in combination: 1. Binary PSK (BPSK), using M=2 symbols 2. Quadrature PSK (QPSK), using M=4 symbols 3. 8PSK, using M=8 symbols 4. 16PSK, using M=16 symbols 5. Differential PSK (DPSK) 6. Differential QPSK (DQPSK) 7. Offset QPSK (OQPSK) 8. p/4–QPSK 9. Audio frequency-shift keying (AFSK) 10. Multi-frequency shift keying (M-ary FSK or MFSK) 11. Dual-tone multi-frequency (DTMF) 12. Amplitude-shift keying (ASK) 13. On-off keying (OOK), the most common ASK form 14. M-ary vestigial sideband modulation, for example 8VSB 15. Quadrature amplitude modulation (QAM), a combination of PSK and ASK 16. Polar modulation like QAM a combination of PSK and ASK 17. Minimum-shift keying (MSK) 18. Gaussian minimum-shift keying (GMSK) 19. Continuous-phase frequency-shift keying (CPFSK) 20. Orthogonal frequency-division multiplexing (OFDM) modulation 21. Discrete multitone (DMT), including adaptive modulation and bit-loading 22. Wavelet modulation 23. Trellis coded modulation (TCM), also known as Trellis modulation 24. Direct-sequence spread spectrum (DSSS) 25. Chirp spread spectrum (CSS) according to IEEE 802.15.4a CSS uses pseudo-stochastic coding 26. Frequency-hopping spread spectrum (FHSS) applies a special scheme for channel release "Motor" generally refers to a machine that supplies motive power for a device with moving parts. The motor can include rotor and linear type motors. The motor can be powered in any number of ways, such as via electricity, internal combustion, pneumatics, and/or hydraulic power sources. By way of non-limiting examples, the motor can include a servomotor, a pneumatic motor, a hydraulic motor, a steam engine, a pneumatic piston, a hydraulic piston, and/or an internal combustion engine.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

"Node" means an electrical junction between two or more electrical components, wherein the voltage at all physical points within the node is substantially equal.

"Original Equipment Manufacturer" or "OEM" generally refers to an organization that makes finished devices from component parts bought from other organizations that are usually sold under their own brand in a consumer or commercial market.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Power Cable" generally refers to a cable configured to transfer electrical power as part of an electrical circuit. A power cable may be used exclusively to transfer power, or it may be used to also transfer signals, such as in the case of a Power Line Communication (PLC) system.

"Power Converter" generally refers to a device that changes one form of energy to another form. In electrical systems, power converters change electric energy from one form to another, such as converting alternating current (AC) to direct current (DC) (or vice-versa) and/or changing electrical voltage, current, frequency, and/or phase of the electricity. For DC to DC conversion, the power converter can include voltage regulators and/or linear regulators. The power converter can include an inverter to change DC to AC, and the power converter can include a rectifier to change AC to DC. For AC to AC conversion, the power converter can include a transformer, autotransformer, variable-frequency transformer, voltage converter, voltage regulator, and/or cycloconverter. These of course are just a few non-limiting examples. Power converters can also change other forms of energy, such as mechanical and/or chemical energy, to name just a few. For instance, the power converter can include a hydraulic pump that converts electrical energy to mechanical energy when the energy storage system is in the form of a hydraulic accumulator.

"Power Line Communication (plc)" generally refers to a system of electronic communication that transmits and receives signals on the same circuit used to transfer power. Examples including system that send data over common AC wiring in a home, or Broadband over Power Line (BPL) systems for carrying network traffic over high voltage transmission lines, as well as systems for in-vehicle communications. In the vehicle context, data, voice, music and video signals may be transferred to throughout a vehicle by over direct current DC battery power-line. One example of is DC-BU, a technology for reliable and economical communication over noisy DC or AC power lines. Digital input data may be modulated and carried over the power line and then demodulated into the original digital data up receipt. In DC-BUS or other PLC implementations, the signaling technology is byte oriented, allowing transfer of a single UART data byte or more over noisy channel (such as the powerline) at bit-rate up to 115.2 kbit/s, each transmitted byte is protected against errors caused by noisy environment. This method may operate on a channel ranging in the HF band. A narrow band signaling modulation may be used that is based on a combination of phase changes to transfer each byte. There is no restriction to the number of bytes. Any Universal Asynchronous Receiver-Transmitter (UART) based standards such as RS-232, RS-485 and LIN-bus can use a DC-BUS as a physical layer (as referred to in the OSI model).

"Power Supply" or "Power Source" generally refers to an electrical device that provides electrical power to an electrical load, such as electrical machines and/or electronics.

"Powertrain" or "Powerplant" generally refers to devices and/or systems used to transform stored energy into kinetic energy for propulsion purposes. The powertrain can include multiple power sources and can be used in non-wheel-based vehicles. By way of non-limiting examples, the stored energy sources can include chemical, solar, nuclear, electrical, electrochemical, kinetic, and/or other potential energy sources. For example, the powertrain in a motor vehicle includes the devices that generate power and deliver the power to the road surface, water, and/or air. These devices in the powertrain include engines, motors, transmissions, drive shafts, differentials, and final drive components (e.g., drive wheels, continuous tracks, propeller, thrusters, etc.).

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of 2200 Mission College Boulevard, Santa Clara, Calif. 95052, USA. In another example, the processor uses a Reduced Instruction Set Computing (RISC) architecture, such as an Advanced RISC Machine (ARM) type processor developed and licensed by ARM Holdings of Cambridge, United Kingdom. In still yet other examples, the processor can include a Central Processing Unit (CPU) and/or an Accelerated Processing Unit (APU), such as those using a K8, K10, Bulldozer, Bobcat, Jaguar, and Zen series architectures, supplied by Advanced Micro Devices, Inc. (AMD) of Santa Clara, Calif. Another example of a processor is an Application-Specific Integrated Circuit (ASIC). An ASIC is an Integrated Circuit (IC) customized to perform a specific series of logical operations for controlling the computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured. In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. An FPGA may be programmed to perform a specific series of instructions which may be retained in nonvolatile memory cells in the FPGA. The FPGA may be configured by a customer or a designer using a Hardware Description Language (HDL). An FPGA may be reprogrammed using another computer to reconfigure the FPGA to implement a new set of commands or operating instructions. Such an operation may be executed in any suitable means such as by a firmware upgrade to the processor circuitry. Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, and the unknown number may automatically change over time as well. The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Sensor" generally refers to an object whose purpose is to detect events and/or changes in the environment of the sensor, and then provide a corresponding output. Sensors include transducers that provide various types of output, such as electrical and/or optical signals. By way of non-limiting examples, the sensors can include pressure sensors, ultrasonic sensors, humidity sensors, gas sensors, motion sensors, acceleration sensors, displacement sensors, force sensors, optical sensors, and/or electromagnetic sensors. In some examples, the sensors include barcode readers, RFID readers, and/or vision systems.

"Server" generally refers to a computer or group of computers that provide(s) data to other computers. It may serve data to systems on a local area network (LAN) or a wide area network (WAN) over the Internet.

"Substantially" generally refers to the degree by which a quantitative representation may vary from a stated reference without resulting in an essential change of the basic function of the subject matter at issue. The term "substantially" is utilized herein to represent the inherent degree of uncertainty that may be attributed to any quantitative comparison, value, measurement, and/or other representation.

"Transceiver" generally refers to a device that includes both a transmitter and a receiver that share common circuitry and/or a single housing. Transceivers are typically, but not always, designed to transmit and receive electronic signals, such as analog and/or digital radio signals.

"Transmit" generally refers to causing something to be transferred, communicated, conveyed, relayed, dispatched, or forwarded. The concept may or may not include the act of conveying something from a transmitting entity to a receiving entity. For example, a transmission may be received without knowledge as to who or what transmitted it. Likewise the transmission may be sent with or without knowledge of who or what is receiving it. To "transmit" may include, but is not limited to, the act of sending or broadcasting electromagnetic energy at any suitable frequency in the electromagnetic spectrum. Transmissions may include digital signals which may define various types of binary data such as datagrams, packets and the like. A transmission may also include analog signals.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vision System" generally refers to one or more devices that collect data and form one or more images by a computer and/or other electronics to determine an appropriate position and/or to "see" an object. The vision system typically, but not always, includes an imaging-system that incorporates hardware and software to generally emulate functions of an eye, such as for automatic inspection and robotic guidance. In some cases, the vision system can employ one or more video cameras, Analog-to-Digital Conversion (ADC), and Digital Signal Processing (DSP) systems. By way of a non-limiting example, the vision system can include a charge-coupled device for inputting one or more images that are passed onto a processor for image processing. A vision system is generally not limited to just the visible spectrum. Some vision systems image the environment at infrared (IR), visible, ultraviolet (UV), and/or X-ray wavelengths. In some cases, vision systems can interpret three-dimensional surfaces, such as through binocular cameras.

"Wire" means elongated electrically conductive metal(s). This includes an individual strand, multiple strands (twisted, braided and/or not), traces, strips and other cross-sectional geometries.

The term "or" is inclusive, meaning "and/or".

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
|---|---|
| 100 | vehicle |
| 105 | powertrain system |
| 110 | braking system |
| 115 | speed control system |
| 120 | powertrain |
| 125 | powertrain control module |
| 130 | brakes |
| 135 | brake control module |
| 140 | throttle |
| 145 | speed control module |
| 200 | control system |
| 205 | input communication channel |
| 210 | controller |
| 215 | output communication channel |

-continued

| Reference Numbers | |
|---|---|
| 220 | functional algorithms |
| 305 | level 1 algorithm |
| 310 | level 2 algorithm |
| 315 | level 3 algorithm |
| 320 | command communication link |
| 325 | nodes |
| 330 | safety communication link |
| 335 | output communication link |
| 340 | node |
| 345 | verification communication link |
| 350 | enabling communication link |
| 400 | safety supervisor system |
| 405 | input communication channel |
| 410 | controller |
| 415 | safety supervisor |
| 420 | output communication channel |
| 425 | controller algorithm |
| 430 | safety supervisor algorithm |
| 435 | command communication link |
| 440 | nodes |
| 445 | safety supervisor communication link |
| 450 | output communication link |
| 455 | node |
| 460 | verification communication link |
| 465 | enabling communication link |
| 505 | level 2 algorithm |
| 510 | level 3 algorithm |
| 605 | sensors |
| 610 | electronic control unit |
| 615 | actuators |
| 620 | sensor communication link |
| 625 | safety supervisor communication link |
| 630 | ECU communication link |
| 635 | actuator communication link |
| 700 | diesel engine controller system |
| 705 | input communication channel |
| 710 | diesel engine controller |
| 715 | outputs |
| 720 | accelerator pedal |
| 725 | intake manifold pressure |
| 730 | exhaust manifold pressure |
| 735 | controller |
| 740 | safety supervisor |
| 745 | output device |
| 750 | level 1 algorithm |
| 755 | level 2 algorithm |
| 760 | level 3 algorithm |
| 765 | fuel injector driver |
| 770 | command communication link |
| 775 | nodes |
| 780 | safety supervisor communication link |
| 785 | output communication link |
| 790 | node |
| 795 | verification communication link |
| 797 | enabling communication link |
| 800 | motor controller system |
| 805 | input communication channel |
| 810 | motor controller |
| 815 | outputs |
| 820 | enable interlock |
| 825 | speed feedback |
| 830 | command message |
| 835 | controller |
| 840 | safety supervisor |
| 845 | output device |
| 850 | level 1 algorithm |
| 855 | level 2 algorithm |
| 860 | level 3 algorithm |
| 865 | output contactor |
| 870 | command communication link |
| 875 | nodes |
| 880 | safety supervisor communication link |
| 885 | output communication link |
| 890 | node |
| 895 | verification communication link |
| 897 | enabling communication link |
| 900 | computing device |
| 905 | computing module |
| 910 | power module |
| 915 | communication module |
| 920 | input module |
| 925 | output module |
| 930 | processor |
| 935 | memory |
| 1000 | safety supervisor system |
| 1005 | input signals |
| 1010 | safety supervisor |
| 1015 | output signals |
| 1020 | input modules |
| 1025 | computing module |
| 1030 | power module |
| 1035 | output modules |
| 1040 | common input bus |
| 1045 | nodes |
| 1050 | vehicle CAN bus |
| 1055 | customer ECU CAN bus |
| 1060 | common output bus |
| 1065 | nodes |
| 1100 | connection schematic |
| 1105 | input bus pin diagram |
| 1110 | output bus pin diagram |
| 1115 | wiring diagram |
| 1120 | input modules |
| 1125 | computing module |
| 1130 | output modules |
| 1135 | power module |
| 1140 | DC pin |
| 1145 | first CAN pin |
| 1150 | second CAN pin |
| 1155 | third CAN pin |
| 1160 | fourth CAN pin |
| 1165 | DC return pin |
| 1200 | safety supervisor kit |
| 1205 | cord cover |
| 1210 | backplane system |
| 1215 | computing module card |
| 1220 | power module card |
| 1225 | input module cards |
| 1230 | output module cards |
| 1300 | stacked packaging configuration |
| 1305 | spacers |
| 1400 | safety supervisor circuit board |
| 1405 | backplane |
| 1410 | daughter boards |
| 1500 | safety supervisor software architecture |
| 1505 | application layer |
| 1510 | runtime environment |
| 1515 | basic software |
| 1520 | microcontroller hardware |
| 1525 | services layer |
| 1530 | ECU abstraction layer |
| 1535 | microcontroller abstraction layer |
| 1540 | complex drivers |
| 1600 | safety software architecture |
| 1605 | application MCU |
| 1610 | QM application |
| 1615 | ASIL application |
| 1620 | runtime environment |
| 1625 | operating software |
| 1630 | basic software |
| 1635 | hardware |
| 1640 | software components |
| 1645 | software components |
| 1650 | basic software modules |
| 1655 | communication link |
| 1700 | safety software architecture |
| 1705 | application MCU |
| 1710 | QM application |
| 1715 | ASIL application |

-continued

| Reference Numbers | |
|---|---|
| 1720 | runtime environment |
| 1725 | operating software |
| 1730 | QM basic software |
| 1735 | ASIL basic software |
| 1740 | hardware |
| 1745 | software components |
| 1750 | software components |
| 1755 | basic software module |
| 1760 | basic software module |
| 1765 | communication link |
| 1770 | communication link |
| 1800 | safety supervisor software architecture |
| 1805 | application MCU |
| 1810 | safety supervisor MCU |
| 1815 | QM application |
| 1820 | runtime environment |
| 1825 | operating software |
| 1830 | QM basic software |
| 1835 | hardware |
| 1840 | ASIL application |
| 1845 | runtime environment |
| 1850 | operating software |
| 1855 | ASIL basic software |
| 1860 | hardware |
| 1865 | software components |
| 1870 | basic software module |
| 1875 | communication link |
| 1880 | software components |
| 1885 | basic software module |
| 1890 | communication link |
| 1900 | acceleration safety system |
| 1902 | wheels |
| 1905 | first ASIL section |
| 1910 | second ASIL section |
| 1915 | third ASIL section |
| 1920 | acceleration pedal |
| 1925 | ECU |
| 1930 | actuators |
| 1935 | sensors |
| 1940 | engine |
| 1945 | TCU |
| 1950 | actuators |
| 1955 | sensors |
| 1960 | transmission |
| 1965 | speed sensor |
| 1970 | EBC |
| 1975 | brake pedal |
| 1980 | actuators |
| 1981 | sensors |
| 1982 | master cylinder |
| 1983 | speed sensor |
| 1984 | electrical link |
| 1985 | electrical link |
| 1986 | electrical link |
| 1987 | communication link |
| 1988 | mechanical link |
| 1989 | electrical link |
| 1990 | electrical link |
| 1991 | electrical link |
| 1992 | mechanical link |
| 1993 | electrical link |
| 1994 | electrical link |
| 1995 | electrical link |
| 1996 | electrical link |
| 1997 | mechanical link |
| 2000 | acceleration safety supervisor system |
| 2002 | wheels |
| 2005 | first ASIL section |
| 2010 | second ASIL section |
| 2012 | first QM section |
| 2015 | second QM section |
| 2020 | safety supervisor |
| 2022 | acceleration pedal |
| 2025 | input modification |
| 2030 | speed sensor |

-continued

| Reference Numbers | |
|---|---|
| 2032 | input modification |
| 2035 | EBC |
| 2040 | brake pedal |
| 2042 | sensors |
| 2045 | actuators |
| 2050 | master cylinder |
| 2052 | speed sensor |
| 2055 | ECU |
| 2060 | sensors |
| 2062 | actuators |
| 2065 | engine |
| 2070 | TCU |
| 2072 | actuators |
| 2075 | sensors |
| 2080 | transmission |
| 2081 | communication link |
| 2082 | communication link |
| 2083 | communication link |
| 2084 | communication link |
| 2085 | communication link |
| 2086 | electrical link |
| 2087 | electrical link |
| 2088 | electrical link |
| 2089 | electrical link |
| 2090 | mechanical link |
| 2091 | electrical link |
| 2092 | electrical link |
| 2093 | mechanical link |
| 2094 | electrical link |
| 2095 | electrical link |
| 2096 | mechanical link |
| 2097 | communication link |

What is claimed is:

1. A system, comprising:
   at least one vehicle controller;
   a safety controller configured to monitor the vehicle controller;
   wherein the vehicle controller is separate from the safety controller;
   wherein the vehicle controller has a level 1 algorithm;
   wherein the level 1 algorithm is configured to control basic operations of a vehicle by issuing commands based on input signals;
   wherein the safety controller has a level 2 algorithm;
   wherein the level 2 algorithm is configured to monitor the input signals to and the commands from the level 1 algorithm;
   wherein the level 2 algorithm is configured to override the commands from the level 1 algorithm when the level 1 algorithm is not properly functioning;
   wherein the safety controller has a level 3 algorithm;
   wherein the level 3 algorithm is configured to monitor the level 2 algorithm;
   wherein the level 3 algorithm is configured to override the level 2 algorithm when the level 2 algorithm is not properly functioning;
   wherein the level 2 algorithm and the level 3 algorithm of the safety controller are designed to a higher safety standard than the level 1 algorithm of the vehicle controller;
   wherein the vehicle controller includes a first electronic control unit and a second electronic control unit;
   wherein the safety controller is configured to monitor the first electronic control unit and the second electronic control unit at the same time;
   wherein the first electronic control unit controls a first vehicular function;

wherein the second electronic control unit controls a second vehicular function; and wherein the first vehicular function and the second vehicular function are different vehicular functions.

2. The system of claim 1, wherein the safety controller is operatively connected to monitor inputs and outputs of the vehicle controller.

3. The system of claim 1, wherein the safety controller is configured to override vehicle controller commands to items controlled by the vehicle controller.

4. The system of claim 1, wherein the vehicle controller handles level 1 functions and safety controller handles levels 2 and 3 monitoring.

5. The system of claim 1, further comprising:
an input communication channel communicatively linked to the vehicle controller to provide the input signals to the vehicle controller;
an output communication channel communicatively linked to the vehicle controller to receive the commands from the vehicle controller;
wherein the level 1 algorithm is configured to control operations of the vehicle by issuing the commands on the output communication channel based on the input signals from the input communication channel;
a safety supervisor communication link communicatively linked between the input communication channel and the safety controller to provide the input signals to the safety controller;
wherein the level 2 algorithm is configured to monitor the input signals to the level 1 algorithm of the vehicle controller via the safety supervisor communication link;
a verification communication link communicatively linked between the output communication channel and the safety controller to provide the commands from the vehicle controller to the safety controller;
wherein the level 2 algorithm is configured to monitor the commands from the level 1 algorithm of the vehicle controller via the verification communication link;
a level 2 enabling communication link communicatively linked between the level 2 algorithm of the safety controller and the output communication channel;
wherein the level 2 algorithm is configured to override the commands from the level 1 algorithm via the level 2 enabling communication link when the level 1 algorithm is not properly functioning;
wherein the level 2 algorithm is configured to activate a safe state of the vehicle when the level 1 algorithm is not properly functioning;
wherein the level 3 algorithm is communicatively linked to the level 2 algorithm;
a level 3 enabling communication link communicatively linked between the level 3 algorithm of the safety controller and the output communication channel;
wherein the level 3 algorithm is configured to override the commands from the level 2 algorithm via the level 3 enabling communication link when the level 2 algorithm is not properly functioning; and
wherein the level 3 algorithm is configured to activate the safe state of the vehicle when the level 2 algorithm is not properly functioning.

6. The system of claim 1, wherein the safety controller includes a standard computing module with customized input and output modules.

7. The system of claim 1, wherein the first electronic control unit includes an engine control unit (ECU) configured to control an engine.

8. The system of claim 7, wherein the second electronic control unit includes an electronic brake control (EBC) configured to control brakes.

9. The system of claim 7, wherein the second electronic control unit includes a transmission control unit (TCU) configured to control a transmission.

10. The system of claim 1, wherein the vehicle controller includes an electronic control unit (ECU).

11. The system of claim 10, wherein the ECU includes a powertrain control module (PCM).

12. The system of claim 10, wherein the ECU includes a brake control module (BCM).

13. The system of claim 10, wherein the ECU includes a transmission control module (TCM).

14. The system of claim 10, wherein the ECU includes an engine control module (ECM).

15. The system of claim 1, further comprising:
a controller area network (CAN) operatively connecting the safety controller to the vehicle controller.

16. The system of claim 1, further comprising:
an input communication channel communicatively linked to the vehicle controller to provide the input signals to the vehicle controller;
an output communication channel communicatively linked to the vehicle controller to receive the commands from the vehicle controller;
wherein the level 1 algorithm is configured to control operations of the vehicle by issuing the commands on the output communication channel based on the input signals from the input communication channel;
wherein the level 3 algorithm is communicatively linked to the level 2 algorithm;
a safety supervisor communication link communicatively linked between the input communication channel and the safety controller to provide the input signals to the safety controller;
wherein the level 2 algorithm is configured to monitor the input signals to the level 1 algorithm of the vehicle controller via the safety supervisor communication link;
a verification communication link communicatively linked between the output communication channel and the safety controller to provide the commands from the vehicle controller to the safety controller;
wherein the level 2 algorithm is configured to monitor the commands from the level 1 algorithm of the vehicle controller via the verification communication link;
an enabling communication link communicatively linked between the safety controller and the output communication channel; and
wherein the level 2 algorithm is configured to override the commands from the level 1 algorithm via the enabling communication link when the level 1 algorithm is not properly functioning.

17. The system of claim 1, wherein the first electronic control unit includes a transmission control unit (TCU) configured to control a transmission.

18. The system of claim 17, wherein the second electronic control unit includes an electronic brake control (EBC) configured to control brakes.

* * * * *